(12) United States Patent
Newham et al.

(10) Patent No.: US 8,948,821 B2
(45) Date of Patent: Feb. 3, 2015

(54) NOTIFICATION BASED ON USER CONTEXT

(71) Applicant: QUALCOMM Incorporated, San Diego, CA (US)

(72) Inventors: Adam E. Newham, Poway, CA (US); Nikhil Jain, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 236 days.

(21) Appl. No.: 13/664,408

(22) Filed: Oct. 30, 2012

(65) Prior Publication Data

US 2013/0316744 A1   Nov. 28, 2013

Related U.S. Application Data

(60) Provisional application No. 61/652,227, filed on May 27, 2012.

(51) Int. Cl.
*H04B 1/38* (2006.01)

(52) U.S. Cl.
USPC ............ 455/567; 455/412.2; 455/415

(58) Field of Classification Search
CPC ....... H04M 19/04; H04M 1/57; H04M 1/663; H04M 1/72519; H04M 1/72563; H04M 1/72566; H04M 1/72569; H04M 1/72572
USPC ...................... 455/412.2, 415, 567
See application file for complete search history.

(56) References Cited

U.S. PATENT DOCUMENTS

| | | | |
|---|---|---|---|
| 5,870,684 A * | 2/1999 | Hoashi et al. | 455/567 |
| 6,974,928 B2 * | 12/2005 | Bloom | 209/583 |
| 7,953,665 B2 * | 5/2011 | Deeds et al. | 705/51 |
| 7,996,046 B2 | 8/2011 | Vargas et al. | |
| 7,996,496 B2 | 8/2011 | Haartsen et al. | |
| 7,996,571 B2 | 8/2011 | Salokannel | |
| 8,073,495 B2 | 12/2011 | Chiu et al. | |
| 2003/0054867 A1 | 3/2003 | Dowlat et al. | |
| 2004/0198427 A1 * | 10/2004 | Kimbell et al. | 455/556.1 |
| 2004/0203644 A1 * | 10/2004 | Anders et al. | 455/414.1 |
| 2005/0008135 A1 * | 1/2005 | Bressler | 379/211.01 |
| 2006/0248183 A1 | 11/2006 | Barton | |
| 2007/0061736 A1 * | 3/2007 | Newton et al. | 715/745 |
| 2009/0298511 A1 * | 12/2009 | Paulson | 455/456.1 |
| 2010/0210313 A1 * | 8/2010 | Huang et al. | 455/567 |
| 2010/0240345 A1 | 9/2010 | Karrman et al. | |
| 2011/0059769 A1 | 3/2011 | Brunolli | |
| 2012/0044062 A1 | 2/2012 | Jersa et al. | |

* cited by examiner

FOREIGN PATENT DOCUMENTS

EP   1365564 A1   11/2003

OTHER PUBLICATIONS

International Search Report and Written Opinion—PCT/US2013/039404—ISP/EPO—Jul. 23, 2013.

*Primary Examiner* — Wesley Kim

(57) ABSTRACT

Systems, methods, and devices enable management of notifications across mobile devices and the separation of the notification (e.g., an alarm) from the communication (e.g., an email or SMS message that was the subject of the alarm). By separately managing the manner of notification provided to the user from its associated communication (e.g., managing a vibration or ring announcing a text message separate from the text message itself), the various embodiments enable users to better manage their communications under a variety of circumstances. In the various embodiments, notifications may be managed based on various criteria, such as a communication sender's identity, user device settings, user activities, user device state, user calendar information, time, location, user history data, and/or communication type.

43 Claims, 18 Drawing Sheets

$$AR = DM + CT + (CE*DS) + [A/(T-L)]$$

| Algorithm Result (AR) | Notification |
|---|---|
| AR≥500 | All Outputs |
| 400≤AR<500 | Ring, Vibrate, Display |
| 300≤AR<400 | Vibrate, Display |
| 200≤AR<300 | Display |
| AR<200 | No Notification |

300

| | Delivery Method | Contact Type | Calendar Entry | Device State | Activity | Time | Location | Notification |
|---|---|---|---|---|---|---|---|---|
| 318 | Phone Call | Privileged | Free | Normal | Static | 0600-1700 | US | Ring 1 Display |
| | Phone Call | Friend | Free | Normal | Static | 0600-1700 | US | Ring 2 Display |
| | Phone Call | Privileged | Free | Normal | Moving | 0600-1700 | US | Ring 1 Vibrate |
| | Phone Call | Friend | Free | Normal | Moving | 0600-1700 | US | Ring 2 Vibrate |
| | Phone Call | Privileged | Busy | Normal | Static | 0600-1700 | US | Vibrate |
| | Phone Call | Friend | Busy | Normal | Static | 0600-1700 | US | Light |
| 320 | Phone Call | Privileged | Busy | Normal | Moving | 0600-1700 | US | Secondary Device |
| | Phone Call | Friend | Busy | Normal | Moving | 0600-1700 | US | Light Vibrate |
| | Phone Call | Privileged | Free | Hands Free Enabled | Static | 0600-1700 | US | Ring 1 to Hands Free |
| | Phone Call | Friend | Free | Hands Free Enabled | Static | 0600-1700 | US | Ring 2 to Hands Free |
| | Phone Call | Privileged | Free | Hands Free Enabled | Moving | 0600-1700 | US | Ring 1 Ring 1 to Hands Free |
| | Phone Call | Friend | Free | Hands Free Enabled | Moving | 0600-1700 | US | Ring 2 Ring 2 to Hands Free |
| | Phone Call | Privileged | Busy | Hands Free Enabled | Static | 0600-1700 | US | Ring 1 to Hands Free Vibrate |
| | Phone Call | Friend | Busy | Hands Free Enabled | Static | 0600-1700 | US | Ring 2 to Hands Free Vibrate |
| | Phone Call | Privileged | Busy | Hands Free Enabled | Moving | 0600-1700 | US | Ring 1 to Hands Free Display |
| | Phone Call | Friend | Busy | Hands Free Enabled | Moving | 0600-1700 | US | Voicemail |

FIG. 3A

| | Time | Visible Devices | Network | Notification |
|---|---|---|---|---|
| ... | Work-Morning | None | Work | Ring 3 Display |
| ... | Work-Morning | Boss | Work | Display |
| ... | Lunch | Boss | Work | Vibrate Display |
| ... | Evening | Spouse | Home | Vibrate |
| ... | Evening | None | Home | Ring 2 Vibrate |
| ... | ⋮ | ⋮ | ⋮ | ⋮ |

| Delivery Method (DM) | Weighting Factor |
|---|---|
| Phone Call | 30 |
| SMS | 20 |
| Email | 10 |
| Facebook | -20 |

| Contact Type (CT) | Weighting Factor |
|---|---|
| Friend | 50 |
| Privileged | 90 |
| Unknown | -20 |
| Personal Address Book | 45 |
| Company Address Book | 10 |
| Personal | 40 |
| Business | 15 |
| Golf | 20 |

| Calendar Entry (CE) | Weighting Factor |
|---|---|
| Free | 30 |
| Busy | 20 |
| Meeting | -10 |
| Lunch | -5 |
| Work Day | -5 |
| Weekend | 30 |

| Location (L) | Weighting Factor |
|---|---|
| US | 90 |
| Canada | 80 |
| Other | 5 |
| Home | 10 |
| Work | 20 |
| Car | 30 |

| Device State (DS) | Weighting Factor |
|---|---|
| Normal | 90 |
| Hands Free | 85 |
| Silent | 20 |

| Activity (A) | Weighting Factor |
|---|---|
| Moving | 60 |
| Static | 90 |
| Dark | -15 |
| Light | 30 |

| Time (T) | Weighting Factor |
|---|---|
| 0000-0600 | -10 |
| 0601-1700 | 90 |
| 1701-2359 | 10 |

| Algorithm Result (AR) | Notification |
|---|---|
| AR≥500 | All Outputs |
| 400≤AR<500 | Ring, Vibrate, Display |
| 300≤AR<400 | Vibrate, Display |
| 200≤AR<300 | Display |
| AR<200 | No Notification |

FIG. 5B

NOTIFICATION BASED ON USER CONTEXT

RELATED APPLICATIONS

This application claims the benefit of priority of U.S. Provisional Application 61/652,227 entitled "Notification Based On User Context" filed May 27, 2012.

BACKGROUND

Mobile devices, such as mobile phones, smart phones, tablets, or laptops, may have various types of user notifications including audio, visual, and haptic (e.g., vibration) notifications. These devices may also include various modes combining or restricting some of these notifications (e.g., a smart phone set to vibrate may not ring or a laptop allowing a pop up reminder may not sound an alarm when sound is muted). Current mobile devices may allow users to control notification modes (e.g., silencing a ringing phone that may be interrupting a meeting or movie). However, mobile devices lack a way of shifting among notification modes and/or escalating notifications for important calls or during an alarm event.

Current mobile devices also lack a way of responding (e.g., silencing) notifications without engaging the mobile device itself. For example, if a phone in a briefcase begins ringing, a user must dig through the briefcase and retrieve the phone to stop the ringing. When a user has several devices ringing simultaneously (e.g., a smart phone, tablet, and laptop all announcing the same event on a shared network calendar), acknowledging and silencing all the notifications may be cumbersome for the user. Additionally, the multiple notifications received from mobile devices may overload and/or confuse a user which may increase a user's propensity to overlook or skip important notifications and communications.

SUMMARY

The systems, methods, and devices of the various embodiments enable management of notifications across mobile devices and the separation of the notification (e.g., an alarm) from the communication (e.g., an email or SMS message that was the subject of the alarm). By separately managing the manner of notification provided to the user from its associated communication (e.g., managing a vibration or ring announcing a text message separate from the text message itself), the various embodiments may give a user more control over a number of mobile devices by allowing the user to escalate or dismiss different notifications across one or more mobile devices. In the various embodiments, notifications may be managed based on various criteria, such as a communication sender's identity, user device settings, user activities, user device state, user calendar information, time, location, user history data, and/or communication type.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 3A is data structure diagram illustrating potential elements of a notification control table.

FIG. 3B is another data structure diagram illustrating potential elements of a notification control table.

FIGS. 4A-4G are data structure diagrams illustrating potential elements of weighting factor lookup tables.

FIG. 5A is a diagram of a potential embodiment notification control algorithm.

FIG. 5B is a data structure diagram illustrating potential elements of a notification output table.

DETAILED DESCRIPTION

Figure 1:
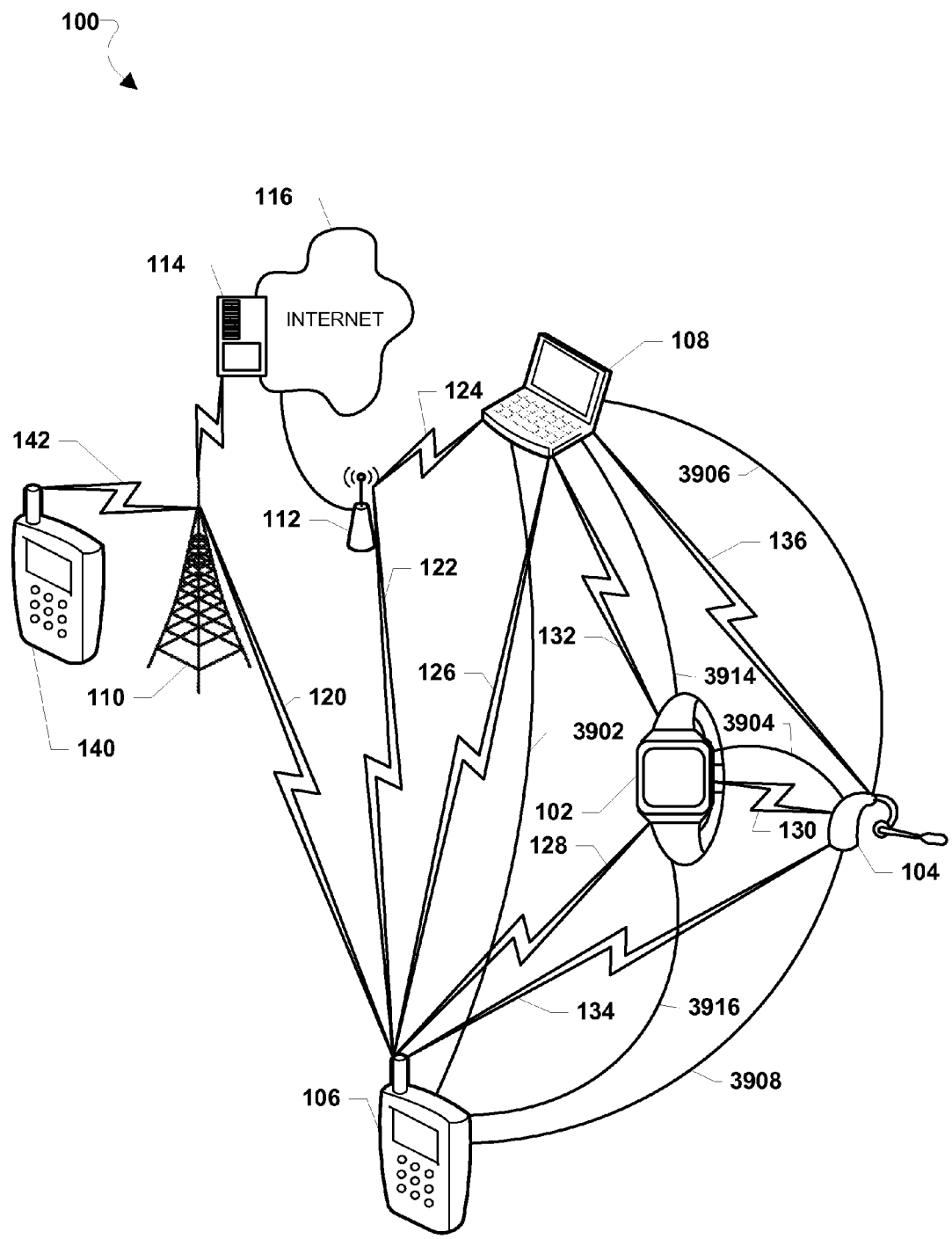
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "receiver device" are used interchangeably herein to refer to any one or all of cellular telephones, smart phones, personal or mobile multi-media players, personal data assistants (PDA's), laptop computers, tablet computers, smart books, palm-top computers, wireless electronic mail receivers, multimedia Internet enabled cellular telephones, wireless gaming controllers, and similar personal electronic devices which include a programmable processor and memory and circuitry for sending and/or receiving voice and data calls, sending and/or receiving messages (e.g., short message service (SMS) messages, e-mails, application notifications, such as Facebook® post notifications and/or game high score change notifications, etc.), sending and/or receiving warnings (e.g., low battery warnings, loss of network connectivity warnings, etc.), and/or sending and/or receiving reminders (e.g., calendar reminders, task reminders, etc.).

As used herein, the term "personal hub" is used herein to refer to any device that may be worn or carried by a user and may interact with a variety of mobile devices and/or earpieces. In an embodiment, a personal hub may be configured to be worn by a user around the user's wrist in a manner similar to that of a wrist watch. In alternative embodiments, a personal hub may be a badge, tag, bracelet, patch, belt buckle, medallion, pen, key chain, or any other device worn or carried by a user. In an embodiment, a personal hub may wirelessly communicate with a user's mobile device(s), such as a smart phone, and a wireless earpiece worn by the user. The personal hub may wirelessly communicate with the user's mobile device(s) to enable the user to operate the user's mobile device(s) remotely. In an embodiment, a personal hub system may include a personal hub and one or two wireless earpieces worn by the user, together enabling a personal hub system user to utilize a user's mobile device(s) remotely.

The various embodiments enable management of notifications across mobile devices and the separation of the notification (e.g., an alarm) from the communication (e.g., an email or SMS message that was the subject of the alarm). The personal hub and one or two wireless earpieces also provide additional mechanisms for communicating notifications to a user, including vibrations of either the personal hub or the wireless earpieces, a display on the personal hub, and tones produced by the wireless earpieces. The various embodiments enable a user or a sender of a message to leverage these additional notification mechanisms to more effectively or privately communicate message and call events to the user. By separately managing the manner of notification provided to the user from its associated communication (e.g., managing a vibration or ring announcing a text message separate from the text message itself), the various embodiments may give a user more control over a number of mobile devices by allowing the user to escalate or dismiss different notifications across one or more mobile devices. In the various embodiments, notifications may be managed based on various criteria, such as a communication sender's identity, user device settings, user activities, user device state, user calendar information, time, location, user history data, and/or communication type.

In an embodiment, a mobile device, such as a smartphone or laptop computer, may be paired with a personal hub and one or two wireless earpieces. The mobile device may receive an incoming communication, such as a voice call (e.g., PSTN call, VoIP call, cellular call, etc.), text based message (e.g., SMS, e-mail), social media message (e.g., Facebook® notification, Tweet®, etc.), whisper message (e.g., a recorded voice message from a YagattaTalk® user), and/or application reminder (e.g., E-bay® auction notification, remote based calendar application reminder, etc.). In an embodiment, a notification controller of the mobile device may manage notifications generated in response to incoming communications based on various criteria, such as a communication sender's identity, user device settings, user activities, user device state, user calendar information, time, location, user history data, and/or communication type. In an embodiment, the functionality of a notification controller may be executed as a software program executing on a processor of the mobile device. Alternatively, the functionality of a notification controller may be executed as a software program executing on a processor of the personal hub. In an embodiment, a notification controller may manage notifications on the mobile device and across various other devices connected to that device, such as a personal hub and/or earpieces.

In an embodiment, a notification controller may reference a notification control table stored in a memory of the mobile device (or personal hub) to determine the notification(s) to generate in response to an incoming communication under current circumstances and context. In an embodiment, the notification control table may cross correlate various criteria and message parameters with potential notifications to enable the processor to select the most appropriate notification to generate in view of all of the information available to it. The criteria that the table may address include, for example, the communication sender's identity, user device settings, user activities, user device state, user calendar information, time, location, user history data, and/or the communication type. In an embodiment, the entries in the notification control table may be user selectable and user definable.

In an embodiment, various weighting factors may be assigned to the various communications related criteria as part of the process by which the mobile device (or personal hub) processor selects a notification for a received communication. Examples of weighting factors that may be assigned include, for example, a communication sender's identity, user device settings, user activities, user device state, user calendar information, time, location, user history data, and/or communication type, with potential notifications. In an embodiment, the weighting factors may be applied in a notification control algorithm to determine the notification(s) to generate in response to an incoming communication. In an embodiment, the executed algorithm may perform one or more various operations, such as addition, subtraction, division, multiplication, etc. using the weighting factors. In an embodiment, the weighting factors may be user selectable and configurable. In an embodiment, a user interface may present the weighting factors for the various communications related criteria and may enable the user to change the weighting factors. As an example, a user interface may present all or a portion of the weighting factors to a user with slide bars that may enable a user to adjust the values of the individual weighting factors. As a further example, a master slide bar may be presented in the user interface which may enable the user to change all the weighting factors and the master slide bar may present the notification type associated with the current weighting factor selections, such as by color coding and/or icons representing the notification type associated with the current weighting factor selections.

In an embodiment, the notification controller may monitor/record actions taken by the user of the mobile device and/or connected devices to determine whether a generated notification was acknowledge or ignored. In an embodiment, a user acknowledgement history data associated with past notifications may be used to modify the notification control table or the weighting factors used in a notification control algorithm. In this manner, the notification control function may include machine learning to adjust the notifications that are selected to reflect those most effective for communicating with the user. In an embodiment, upon a notification being acknowledged all the weighting factors associated with the selected notification may be increased by a value and upon a notification being ignored all the weighting factors associated with the selected notification may be decreased by a value. In this manner, as the user acknowledges and/or ignores notifications over a course of time each weighting factor for the various communications related criteria may be adjusted toward the user's preferences and the notification controller may effectively learn the preferences of the user regarding notifications. In an embodiment, to learn the preferences of the user regarding notifications, the notification controller may display a request, such as pop-up, for the user to input the reason the incoming communication was acknowledged or ignored. As an example, the notification controller may output a pop-up prompt with buttons corresponding to the various communications related criteria and/or weighting factors that were used to select the notification. The user may select one or more of the buttons and the notification control may identify the corresponding weighting factor(s) as weighting factors that should be increased or decreased by a value based on whether the notification was acknowledged or ignored. In this manner, the user provided input via the response to the displayed request may enable the notification controller to only adjust a portion of the weighting factors and more narrowly tailor future notifications to user preferences. In an embodiment, the notification controller may be configured to turn on and/or turn off machine learning. As an example, a user may select whether machine learning should be used to modify weighting factors.

In an embodiment, a notification controller may select notifications for incoming communications based in part on a hierarchy of communication types. As an example, the notification controller may cause the processor to generate more notifications for incoming phone calls, such as both audible and visual notifications, while fewer notifications may be generated in response to incoming emails, such as only visual notifications.

In the various embodiments, a personal hub may be a separate device operating in conjunction with other mobile devices. Alternatively, the functionality of a personal hub may be executed as a software program residing on a mobile device, such as a smart phone or laptop computer. In this manner, a mobile device running a personal hub application may be able to function as a personal hub and a mobile device to implement the methods and the functions of the various embodiments.

FIG. 1 illustrates a network system 100 suitable for use with the various embodiments. The network system 100 may include multiple devices, such as a personal hub 102, an earpiece 104, and two mobile devices, a smart phone 106 and laptop computer 108. The personal hub 102 and the earpiece 104 may exchange data via a wireless data link 130 and/or a wired data link 3904. As an example, the wireless data link 130 between the personal hub 102 and the wireless earpiece may be a Bluetooth® connection. The personal hub 102 may exchange data with the user's mobile device, such as a smart phone 106 and laptop computer 108 and act as a message control center for handy message notification display. For example, the personal hub 102 and the smart phone 106 may exchange data via a wireless data link 128 and/or wired data link 3916, and the personal hub 102 and the laptop computer 108 may exchange data via a wireless data link 132 and/or wired data link 3914. As an example, the wireless data links 128 and 132 may be Bluetooth® connections. The smart phone 106 and the wireless earpiece 104 may exchange data via a wireless data link 134 and/or wired data link 3908. As an example, the wireless data link 134 may be a Bluetooth® connection. The laptop computer 108 and the wireless earpiece 104 may exchange data via a wireless data link 136 and/or wired data link 3906. As an example, the wireless data link 136 may be a Bluetooth® connection. The smart phone 106 and the laptop computer 108 may exchange data directly with each other via a wireless data link 126 or wired data link 3902. As an example, the wireless data link 126 may be a Bluetooth® connection. In the various embodiments, the wired data links 3902, 3904, 3906, 3908, 3914 and 3916 may be cable connections, such as a USB cable, a FireWire® cable, or standard audio analog or digital cables with suitable connectors at each end.

Additionally, the smart phone 106 and the laptop computer 108 may be configured to connect to the Internet 116 via wireless connections 122 and 124, respectively, established with a wireless access point 112, such as a Wi-Fi access point. The wireless access point 112 may connect with the Internet 116. In this manner data may be exchanged between the smart phone 106, the laptop computer 108, and other Internet 116 connected devices by methods well known in the art. Additionally, the smart phone 106 and a cellular tower or base station 110 may exchange data via a cellular connection 120, including CDMA, TDMA, GSM, PCS, 3G, 4G, LTE, or any other type connection. The cellular tower or base station 110 may be in communication with a router 114 which may connect to the Internet 116. In this manner, data (e.g., voice calls, text messages, e-mails, etc.) may be exchanged between the smart phone 106 and other devices by methods well known in the art. In an embodiment, another user's mobile device, such as a smart phone 140, may exchange data with the cellular tower or base station 110 via a cellular connection 142, including CDMA, TDMA, GSM, PCS, 3G, 4G, LTE, or any other type connection. In this manner, data (e.g., voice calls, text messages, e-mails, etc.) may be exchanged between the other user's smart phone 140 and the other devices by methods well known in the art.

The personal hub 102 may serve as a wearable interface for any of a number of user computing devices, particularly mobile devices that are within close range of the user. For example the personal hub 102 may serve as a message notification and management center enabling a user to monitor and react to various types of messages received on the user's laptop computer 108. Also, the personal hub 102 may serve a similar function for messages received on the user's smart phone 106. The personal hub 102 may also perform the same functions for both the user's laptop computer 108 and smart phone 106 when both devices are in communication range. For ease of description the descriptions of the various embodiments refer to interactions with and operations performed by the user's "mobile device" which is intended to encompass any computing device communicating with the user's personal hub 102, including but not limited to a smart phone 106 and a laptop computer 108.

In an embodiment, the earpiece 104 may be connected to the smart phone 106 via a wired data link 3908, and the smart phone 106 may be connected to the personal hub 102 via a wireless data link 128. In this configuration, notifications may be handled wirelessly between the smart phone 106 and the personal hub 102, while audio signals may be handled via the wired connection between the smart phone 106 and the earpiece 104. The wired data link 3908 between the smart phone 106 and the earpiece 104 may reduce the processing required to generate, send, and/or receive wireless signals which may conserve battery power on the smart phone 106 and earpiece 104.

In another embodiment, the personal hub 102 may be connected to the smart phone 106 and/or laptop computer 108 via wireless data links 128 and/or 132, respectively, and the personal hub 102 may be connected to the earpiece 104 by a wired data link 3904. In a further embodiment, the earpiece 104 may be connected to the smart phone 106 and/or laptop computer 108 via wireless data links 134 and/or 136, respectively. In this configuration the personal hub 102 may send/receive information to/from the earpiece 104 via a wired connection while the earpiece 104 may send/receive information to/from the smart phone 106 and/or laptop computer 108 via a wireless connection.

In an additional embodiment, the smart phone 106 may be connected to the laptop computer 108 via a wired data link 3902, and the smart phone 106 may be connected to the personal hub 102 and earpiece 104 via wireless data links 128 and 134, respectively. In this configuration, the laptop computer 108 may send/receive information to/from the smart phone 106 via a wired connection, and the smart phone 106 may send/receive information to/from the personal hub 102 and/or earpiece 104 via wireless connections. As an example, while the smart phone 106 is connected to the laptop computer 108 via a USB connection while the smart phone 106 is charging, the smart phone 106 may receive a reminder via the USB connection, and the smart phone 106 may wirelessly send an alert message associated with the reminder to the personal hub 102.

Figure 2:
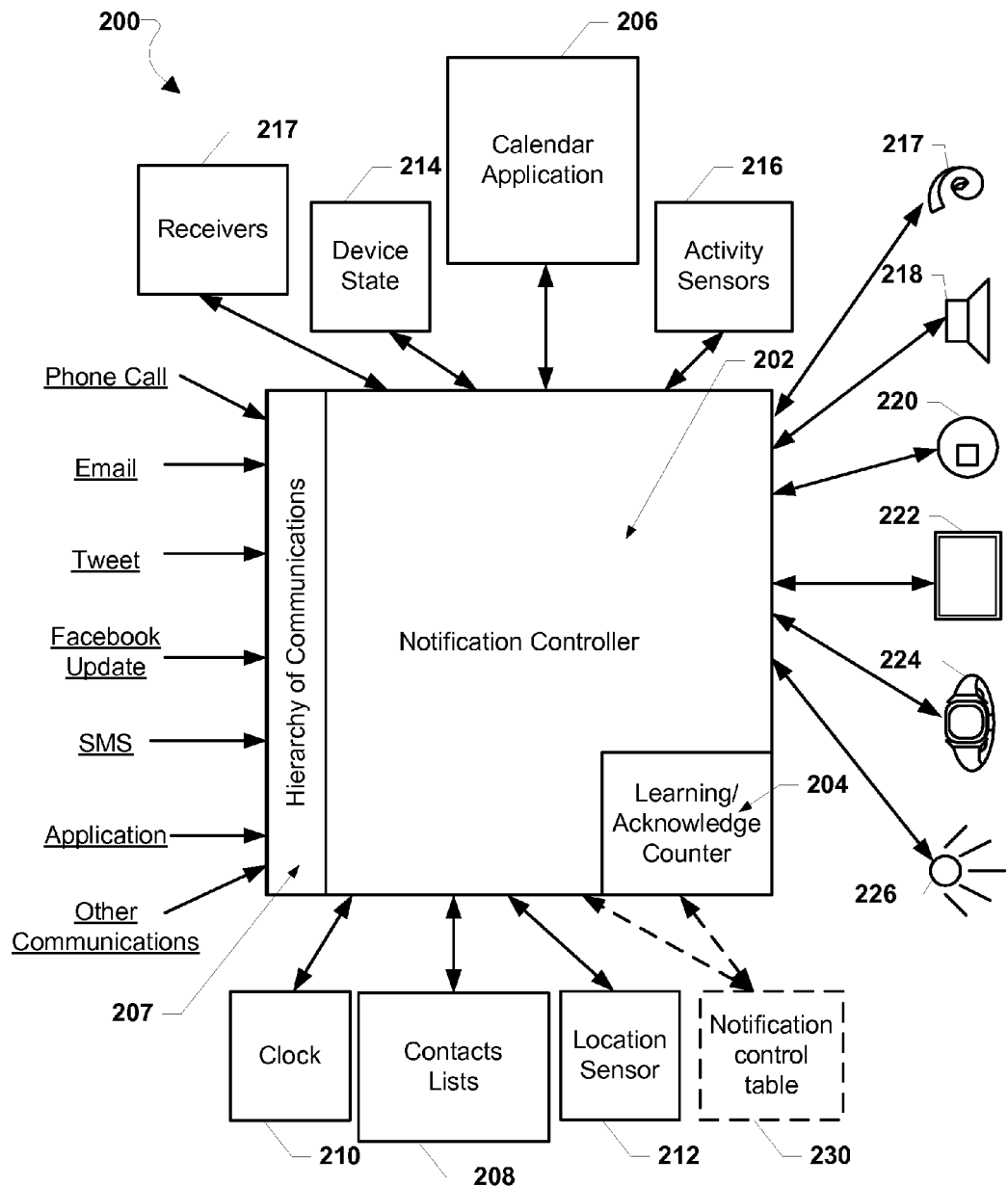
FIG. 2 is a system block diagram of a notification control system suitable for use with the various embodiments.

FIG. 2 illustrates an embodiment notification control system 200. In an embodiment, a notification control system 200 may include a notification controller module 202 coupled to various notification output devices, such as an earpiece 217, speaker 218, vibratory motor 220, display 222, personal hub 224, and light 226. In an embodiment, the functionality of a notification controller module 202 may be implemented as a software program executing on a mobile device, such as a smart phone or laptop computer. In an embodiment, the notification controller module 202 may reference a notification control table 230 stored in a memory of the mobile device to manage notifications generated in response to incoming communications. In another embodiment, weighting factors assigned to various criteria may be stored in a memory of the mobile device, and using the weighting factors the notification controller module 202 may execute a notification control algorithm to manage notifications generated in response to incoming communications.

In an embodiment, the notification controller module 202 may access a calendar application 206 resident on the mobile device and/or stored at a remote server to determine calendar entries and/or scheduled activities associate with the mobile device user. In an embodiment, a determined calendar entry may be a simple determination of status, such as "Free" or "Busy." In another embodiment, a determined calendar entry may be a detailed entry, such as an indication of a specific scheduled event, that event's location, and a scheduled duration. As examples, calendar entries may include "Meeting", "Lunch", "Work Day", "Weekend", etc.

In an embodiment, the notification controller module 202 may access one or more contact lists (e.g., contact databases) 208 stored in the memory of the mobile device and/or stored remotely, such as on a server. In an embodiment, the contact lists 208 may indicate a priority among contacts. For example, a contact in the contact lists 208 may be designated as a privileged contact, and the designation as privileged may indicate incoming communications from the privileged contact should receive higher priority/increased notifications than other contacts listed in the contact lists 208 and/or unknown caller/senders. In an embodiment, tags may be assigned to contacts and/or groups of contacts in the contact lists 208. As an example, contacts and/or groups of contacts may be designated with tags, such as "Privileged", "Friend", "Work Colleague", "Business", "Golf", or "Family Member." In an embodiment, the tags for contacts and/or groups of contacts may be individually set by a user in a contact list and/or assigned to all contacts based on the contact list. As an example, all members of a contact list associated with a work place exchange server may be designated with the tag "Work Colleague" unless otherwise designated by the user. In an embodiment, the storage location of the contact list 208 (e.g., locally stored on the device or remotely stored off the device) including the contact and/or group of contacts may control the tag associated with the contact and/or group. As an example, contacts within a personal address book stored on the device may be designated with a "Personal" tag, while contacts within a company address book stored at a company server may be designated with a "Business" tag.

In an embodiment, the notification controller module 202 may access a clock 210 to determine time information. As an example, time information may include the current time at the mobile device. As an example, time information may be a direct time, such as a numerical value "0905" or "0900-1000". As another example, time information may be a tag indicating a time dependent activity, such as "evening", "work-morning", "lunch time", or "work-afternoon." In an embodiment, tags may be textual representations and/or numerical equivalents/enumerations.

In an embodiment, the notification controller module 202 may access a location sensor 212, such as a GPS receiver, to determine location information. As an example, location information may include the GPS coordinates of the mobile device. As another example, location information may be a geographic indication, such as "US" or "Canada." In an embodiment, the notification controller module 202 may correlate position information, such as GPS coordinates, with map information and/or address book/contact list information, to determine location information. As examples, correlations between GPS coordinates and map information may enable the notification controller module 202 to determine locations information such as "Work" when the GPS coordinates correspond to the user's business coordinates, "Home" when the GPS coordinates correspond to the user's house's coordinates, or "Car" when the GPS coordinates correspond to a highway.

In an embodiment, the notification controller module 202 may access device state data 214. As an example, device state data 214 may include device settings or device modes (e.g., normal, silent, hands free, speaker phone, etc.). In an embodiment, the notification controller module 202 may access activity sensors 216 of the mobile device, such as light sensors, accelerometers, gyroscopes, etc. to determine the current activity associated with the mobile device. As an example, data received from the activity sensors 216 may indicate the mobile device is moving, static, in darkness, or in light.

In an embodiment, the notification controller module 202 may access wireless network transceivers 217 of the mobile device, such as Bluetooth® transceivers, Wi-Fi transceivers, etc. to determine visible devices and/or networks. As an example, Bluetooth® pairing data received by a Bluetooth® transceiver of the user's mobile device from other individuals' mobile devices may indicate the identity of other people in close proximity to the mobile device. As another example, network identifiers received by a WiFi transceiver from a Wi-Fi access node may indicate a location of the mobile device (e.g., on a particular floor of a multistory building or in a coffee shop). If the mobile device is coupled to a wired network (e.g., via an Ethernet connection), the notification controller module 202 may also access a wired network transceiver, such as USB ports and/or Ethernet ports.

In an embodiment, the notification controller module 202 may use device state data 214 and/or data from the calendar application 206, contact lists 208, clock 210, location sensor 212, activity sensors 216, and/or wireless network transceivers 217 to further refine notification controller module 202 determinations. As an example, data received from the wireless network transceivers 217, such as a network ID, may be used to further refine an initial location determination made based on location data received from the location sensor 212, such as a GPS coordinate. A mobile device user's office may be in a multi-story building, and a GPS coordinate alone may not distinguish which floor the user is on. The notification controller module 202 may use the received network ID of the user's work place network to distinguish when the user is merely in the building lobby from when the user is in their office.

In an embodiment, the notification controller module 202 may establish a hierarchy of communications 207. As an example, incoming phone calls may be given more notifications, such as both audible and visual notifications, while incoming emails may be given less notifications, such as only visual notifications.

In an embodiment, the notification controller module 202 may include a learning/acknowledge counter 204. For example, the notification controller module 202 may monitor the output devices, such as an earpiece 217, speaker 218, vibratory motor 220, display 222, personal hub 224, and light 226, and may determine whether a generated notification was acknowledged or ignored. In an embodiment, notifications associated with repeat acknowledgments may be designated as effective notifications, while notifications which are repeatedly ignored may be designated an ineffective notifications. In an embodiment, the notification controller module 202 may use such history information to modify selected notifications to increase or decrease the likelihood that an incoming communication will be acknowledged. As an example, the notification controller module 202 may modify the selected notifications by increasing or decreasing one or more weighting factors associated with the selected notifications for incoming communications.

In operation, any of a wide variety of incoming communications, such as phone calls, emails, Tweets, Facebook Updates, SMS text messages, application messages, and/or other communications may be received by the notification controller module 202. The notification controller module 202 may correlate the hierarchy of the communications 207 with calendar application 206, contact list 208, location sensor 212, clock 210, activity sensors 216, and device state 214 information to select a notification to output to one or more of the output devices, such as an earpiece 217, speaker 218, vibratory motor 220, display 222, personal hub 224, and light 226. In an embodiment, history information from the learning/acknowledge counter 204 may be used to modify the selected notification prior to outputting it to one or more of the output devices.

FIG. 2 illustrates how the various embodiments enable a user to generate a wide variety of notifications for the wide variety of different kinds of communications that may be received. The notification controller module 202 enables the user to define particular notifications that may encompass combinations of six or more different types of output devices (e.g., an earpiece 217, speaker 218, vibratory motor 220, display 222, personal hub 224, and light 226) for providing custom notifications tailored to the particular incoming communication and wide variety of circumstances and device states. Given the proliferation of communication types and the many output devices enabled by the personal hub and earpiece system, the various embodiments enable users to better manage their communications under a variety of circumstances.

FIG. 3A is a data structure diagram illustrating potential elements of an example notification control table 300. In an embodiment, the notification control table 300 may be a lookup table correlating the communication delivery method 302, contact type 304, calendar entry 306, device state 308, activity information 310, time 312, and location 314 with notifications 316 to be generated. The example notification control table 300 includes only a sample of the types of status and context data and criteria fields that may be used in such a data table, and many more fields may be implemented in practice. The notification controller may compare current status and context data, as well as information regarding an incoming communication to information in the notification control table 300 to determine if there are matches between the communication delivery method 302, contact type 304, calendar entry 306, device state 308, activity information 310, time 312, and location 314, and use corresponding notifications 316 included in matched records in order to select the notifications to be generated. As an example, entry 318 in the notification control table 300 indicates that in response to a phone call ("Phone call") received from a privileged contact ("Privileged") at a time with no corresponding calendar entry ("Free") between the hours of 6:00 AM and 5:00 PM ("0600-1700") while the mobile device is in a normal state ("Normal") and not moving ("static") in the United States ("US"), the mobile device should generate a notification including a first ring type and an incoming call display. As another example, entry 320 in the notification control table 300 indicates that in response to a phone call ("Phone call") received from a listed non-privileged contact ("Friend") at a time with a corresponding calendar entry ("Busy") between the hours of 6:00 AM and 5:00 PM ("0600-1700") while the mobile device is in a normal state ("Normal") and moving ("Moving") in the United States ("US") the mobile device should generate a notification including a flashing light and a vibration. In this manner, each combination of communication delivery method 302, contact type 304, calendar entry 306, device state 308, activity information 310, time 312, and location 314 may result in different notifications 316 being generated. The notification control table 300 illustrated in FIG. 3A is for example purposes only, and more or fewer categories of states and criteria may be used. In an embodiment, the entries in the notification control tables may be user selected and configurable.

FIG. 3B is a data structure diagram illustrating a subset of a notification control table to illustrate additional data fields that may be implemented in a notification control table 330. As illustrated, a notification control table 330 may include more or fewer categories of states and criteria. The notification control table 330 illustrated in FIG. 3B may be part of a single large notification control table 300 like that illustrated in FIG. 3A. Alternatively, the notification control table may be broken into a series of linked decision criteria tables that may be accessed by the notification controller module in a cascading decision algorithm. Thus, the notification control table 330 illustrated in FIG. 3B could be stored in memory and accessed as a stand alone data table. For example, data inputs, such as sensor inputs, time tags, location information, etc., received at the notification controller may be compared to a first notification decision table correlating data inputs to multiple other notification decision tables, each of which may have structures similar to those illustrated in FIGS. 3A and 3B. In such an implementation, the notification controller module may use the first notification decision table to select a second notification decision table based on a first subset of the received data inputs (e.g., state or status data), and then use the second notification decision table to identify a notification to generate based upon a second subset of the receive data inputs. As an example, a first notification decision table may correlate the time tag "Work-Morning" with the use of a particular second notification decision table with entries configured for notifications that the user prefers during those time periods, and correlate the time tag "Evening" with a different second notification decision table with entries configured for after hours notifications. In this manner, a user who works alternating shifts may be enabled to configure their schedule independent of the notifications based on their schedule. This may reduce the user's need to constantly reconfigure all their notifications as their schedule changes.

In an embodiment, the notification control table 330 may be a lookup table correlating the time 332, near-by mobile devices 334 (which are associated to particular individuals), and network identifications 336 with notifications 338 to be generated. The notification controller may compare current status and context data, as well as information regarding an incoming communication to information in the notification control table 330 to determine if there are matches between the time 332, visible devices 334, and network identifications 336, and use corresponding notifications 338 included in matched records in order to select the notifications to be generated. As an example, entry 340 in the notification control table 330 indicates that in response to a time flag indicating it is a work morning ("Work-Morning") and the user's boss's mobile device ("Boss") is near by (e.g., visible to a short-range wireless transceiver, like a Bluetooth® transceiver) while the mobile device is connected to the user's workplace WiFi network ("Work"), the mobile device should generate a notification of a communication in the form of a display on the user's mobile device, and no other visible or audible display. As another example, entry 342 in the notification control table 330 indicates that in response to a time flag indicating it is evening ("Evening") and the user's spouse's mobile device ("Spouse") is nearby while the mobile device is connected to the user's home WiFi network ("Home"), the mobile device should generate a notification that includes a vibration. In this manner, each combination of time 332, visible devices 334, and available wireless network 336 may result in different types and combinations of notifications 338 being generated in response to incoming communications. The notification control table 330 illustrated in FIG. 3B is for example purposes only, and more or fewer categories of states and criteria may be used.

FIGS. 4A-4G are data structure diagrams illustrating potential elements of weighting factor (e.g., value) lookup tables. In an embodiment, top level categories of communication selection criteria, such as delivery method, contact type, calendar entry, location, device state, activity, and time, may be broken down into sub-categories. Each sub-category may be assigned a weighting value. FIG. 4A illustrates an example weighting factor (e.g., value) lookup table 402 for communication delivery methods. In lookup table 402 each delivery method ("DM") sub-category, such as "Phone Call", "SMS", "Email", and "Facebook", may be associated with a weighting value. FIG. 4B illustrates a weighting factor (e.g., value) lookup table 404 for contact types. In lookup table 404 each contact type ("CT") sub-category, such as "Friend", "Privileged", "Unknown", "Personal Address Book", "Company Address Book", "Personal", "Business", and "Golf", may be associated with a weighting value.

FIG. 4C illustrates an example weighting factor (e.g., value) lookup table 406 for calendar entries. In lookup table 406 each calendar entry ("CE") sub-category, such as "Free", "Busy", "Meeting", "Lunch", "Work Day", and "Weekend", may be associated with a weighting value. FIG. 4D illustrates an example weighting factor (e.g., value) lookup table 408 for locations. In lookup table 408 each location ("L") sub-category, such as "US", "Canada", "Other", "Home", "Work", and "Car", may be associated with a weighting value. FIG. 4E illustrates an example weighting factor (e.g., value) lookup table 410 for device states. In lookup table 410 each device state ("DS") sub-category, such as "Normal", "Hands Free", and "Silent", may be associated with a weighting value. FIG. 4F illustrates an example weighting factor (e.g., value) lookup table 412 for activities. In lookup table 412 each activity ("A") sub-category, such as "Moving", "Static", "Dark", and "Light", may be associated with a weighting value. FIG. 4G illustrates an example weighting factor (e.g., value) lookup table 414 for time. In lookup table 410 each time ("T") sub-category, such as "0000-0600", "0601-1700", and "1701-2359", may be associated with a weighting factor. In an embodiment, the weighting values listed in the lookup tables 402, 404, 406, 408, 410, 412, and 414 may be user selectable and configurable. In operation, based on determinations made about the incoming communication, caller/sender identification, and/or user status lookup tables 402, 404, 406, 408, 410, 412, 414 may be used to determine weighting values for use in a notification control algorithm. In an embodiment, the weighting values listed in the lookup tables 402, 404, 406, 408, 410, 412, and 414 may be modified, for example increased or decreased, base on whether notifications generated using the weighting values for the categories and/or sub-categories are acknowledged or ignored by a user.

FIG. 5A illustrates an example embodiment notification control algorithm 502. The notification control algorithm 502 results ("AR") may be the product of executing the algorithm 502 using the weighting values DM, CT, CE, DS, A, T, and L as determined using lookup tables 402, 404, 406, 408, 410, 412 and 414, discussed above. Other algorithms may be used, and in the various embodiments the algorithms may add to, subtract from, multiply, and/or divide one or more of the weighting values when executed. FIG. 5B is a data structure diagram illustrating a potential notification output table 504. The notification output table 504 may correlate notification control algorithm results ("AR"), such as the results of the notification control algorithm 502, to notifications to be generated by the mobile device. In an embodiment, different algorithm results may correspond to different notifications to be generated in response to a particular incoming communication. In an embodiment, the entries in the notification output table 504 may be user selectable and configurable. In an embodiment, the entries in the notification output table 504 may be modified, for example increased or decreased, base on whether notifications are acknowledged or ignored by a user.

Figure 6:
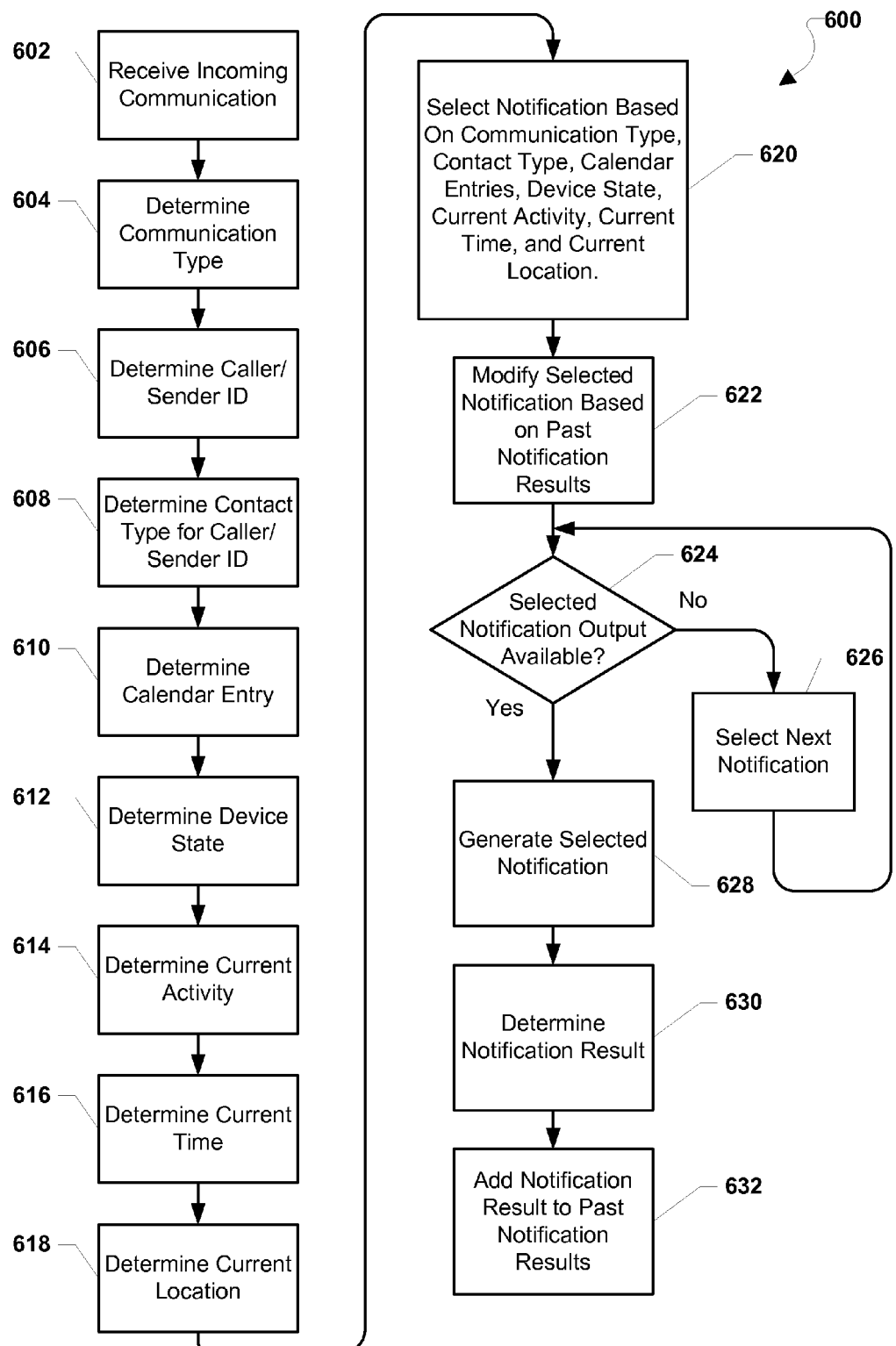
FIG. 6 is a process flow diagram illustrating an embodiment method for generating a selected notification.

FIG. 6 illustrates an embodiment method 600 for generating a selected notification in response to an incoming communication. In an embodiment, the operations of method 600 may be performed by the processor of a mobile device, such as a smart phone or laptop computer, and/or of a personal hub. In block 602 the mobile device may receive the incoming communication. In block 604 the mobile device processor may determine the communication type of the incoming communication. In block 606 the mobile device processor may determine the caller/sender ID of the incoming communication. In block 606 the mobile device processor may determine the contact type for the caller/sender ID. In an embodiment, the contact type may be determined by using the caller/sender ID to look up the individual in a contact list or database available to the mobile device. As an example, the contact list may designate certain contacts as "Privileged" and other contacts as "Friends." In an embodiment, contacts not listed in the contact list may be determined to be "Unknown." In block 610 the mobile device processor may access any calendar entries corresponding to the time at which the incoming communication was received. As an example, a calendar entry may indicate that the user may be "Free" or "Busy." In block 612 the mobile device processor may determine the state of the mobile device, such as by accessing a mobile device state register or operating system data indicating the device's current setting and/or operating mode, such as "silent" or "hands free." In block 614 the mobile device processor may determine the current activity of the user, mobile device, personal hub and/or wireless earpieces. In an embodiment, the current activity may be determined based on sensors of the various devices, such as accelerometers, gyroscopes, and/or light sensors. As an example, accelerometer data may be used to determine whether the mobile device/user is "Moving." In block 616 the mobile device processor may determine the current time such as by accessing a date-time data register or an internal clock of the mobile device. In block 618 the mobile device processor may determine the current location of the mobile device, such as by obtaining GPS coordinates from a GPS receiver.

In block 620 the mobile device processor may select a notification or notifications to be generated to announce the incoming communication based on the communication type, contact type, calendar entries, device state, current activity, current time, current location, or any combination thereof. As described above, in an embodiment, the processor may select the notification(s) by using the determined communication type, contact type, calendar entries, device state, current activity, current time, and current location (or other information) to perform a table look up operation using a notification control table like that illustrated in FIG. 3. Based on that correlation the lookup table may indicate selected notifications to be generated for the incoming communication. As described above, in another embodiment, a notification control algorithm and assigned weighting factors may be used to select the notifications to be generated for the incoming communication.

In block 622 the mobile device processor may modify the selected notification based on past notification results. In an embodiment, a user acknowledgement database may be used to change the selected notification to a notification more likely to be acknowledged by the user of the mobile device.

In determination block 624 the mobile device processor may determine whether the selected notification output is available. As an example, a selected notification output may be an audible ring to an earpiece. However, the earpiece may not be currently connected to the mobile device. If the selected notification out is not available (e.g., determination block 624="No"), in block 626 the mobile device processor may select the next notification available. As an example, because the earpiece may not be connected, rather than generating an audible ring to the earpiece, the mobile device processor may select an audible ring to a speaker of the mobile device as an alternate notification. The processor may return to determination block 624 to determine whether the alternate notification is available.

If the selected notification is available (e.g., determination block 624="Yes"), in block 628 the mobile device processor may generate the selected notification. In an embodiment, generating the selected notification may include directing one or more devices to output one or more notifications. In block 630 the mobile device processor may determine the notification result. In an embodiment, the notification result may be determined by monitoring the device to which the generated notification was sent to determine whether a user input was received acknowledging the notification. In block 632 the mobile device processor may add the notification result to the past notification results. In this manner, a history database of past notification results may be maintained/updated by the mobile device processor.

Figure 7:
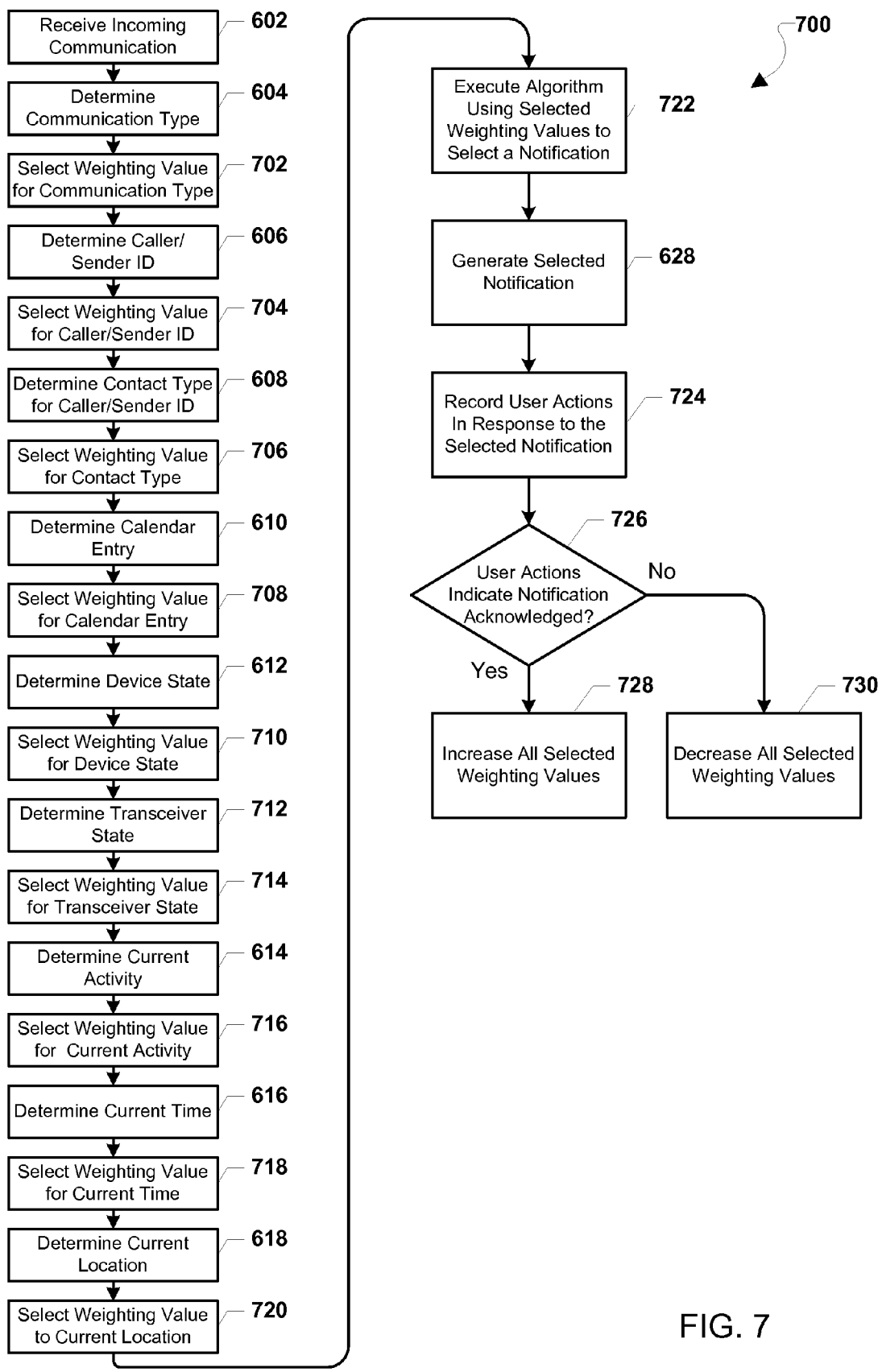
FIG. 7 is a process flow diagram illustrating an embodiment method for modifying assigned weighting values.

FIG. 7 illustrates an embodiment method 700 for executing an algorithm using assigned weighting values to select a notification and modifying assigned weighting values based on user actions. In an embodiment, the operations of method 700 may be performed by the processor of a mobile device, such as a smart phone or laptop computer, and/or of a personal hub. As discussed above, in block 602 the mobile device processor may receive an incoming communication, and in block 604 may determine the communication type of the incoming communication. In block 702 the mobile device processor may select a weighting value for the communication type. In an embodiment, the mobile device processor may select a weighting value for the communication type by retrieving the weighting value corresponding to the determined communication type in a weighting value lookup table.

As discussed above, in block 606 the mobile device processor may determine the caller/sender ID for the incoming communication. In block 704 the mobile device processor may select a weighting value for the caller/sender ID. In an embodiment, the mobile device processor may select a weighting value from the caller/sender ID by retrieving the weighting value corresponding to the determined caller/sender ID from a weighting value lookup table. As discussed above, in block 608 the mobile device processor may determine the contract type for the caller/sender ID. In block 706 the mobile device processor may select a weighting value for the contact type. In an embodiment, the mobile device processor may select a weighting value for the contact type by retrieving the weighting value corresponding to the determined contact type from a weighting value lookup table. As discussed above, in block 610 the mobile device processor may determine a calendar entry. In block 708 the mobile device processor may select a weighting value for the calendar entry. In an embodiment, the mobile device processor may select a weighting value for the calendar entry by retrieving the weighting value corresponding to the determined calendar entry from a weighting value lookup table.

As discussed above, in block 612 the mobile device processor may determine the device state. In block 710 the mobile device processor may select a weighting value for the device state. In an embodiment, the mobile device processor may select a weighting value for the device state by retrieving the weighting value corresponding to the determined device state from a weighting value lookup table. In block 712 the mobile device processor may determine a transceiver state. In an embodiment, the mobile device processor may determine the transceiver state by accessing a transceiver state register or operating system data indicating the current network the mobile device is in and/or the identity of other devices in close proximity to the mobile device. In block 714 the mobile device processor may select a weighting value for the transceiver state. In an embodiment, the mobile device processor may select a weighting vale for the transceiver state by retrieving the weighting value corresponding to the determined transceiver state from a weighting value lookup table.

As discussed above, in block 614 the mobile device processor may determine a current activity. In block 716 the mobile device processor may select a weighting value for the current activity. In an embodiment, the mobile device processor may select a weighting value for the current activity by retrieving the weighting value corresponding to the determined current activity from a weighting value lookup table. As discussed above, in block 616 the mobile device processor may determine a current time. In block 718 the mobile device processor may select a weighting value for the current time. In an embodiment, the mobile device processor may select a weighting value for the current time by retrieving the weighting value corresponding to the determined current time from a weighting value lookup table. As discussed above, in block 618 the mobile device processor may determine a current location. In block 720 the mobile device processor may select a weighting value for the current location. In an embodiment, the mobile device processor may select a weighting value for the current location by retrieving the weighting value corresponding to the determined current time from a weighting value lookup table.

In block 722 the mobile device processor may execute an algorithm using the selected weighting values, such as the weighting values for communication type, caller/sender ID, contact type, calendar entry, device state, transceiver state, current activity, current time, and/or current location, to select a notification. In an embodiment, the executed algorithm may add to, subtract from, multiple, and/or divide at least one of the selected weighting values to select the notification for the incoming communication. In an embodiment, the mobile device processor may select the notification by comparing the result of executing the algorithm to a notification output table to identify the notifications corresponding to the result. As discussed above, in block 628 the mobile device processor may generate the selected notification. In block 724 the mobile device processor may record user actions in response to generating the selected notification. In an embodiment, the mobile device processor may record the user actions in response to generating the selected notification by monitoring the device to which the generated notification was sent to determine whether a user input was received acknowledging or ignoring the notification.

In determination block 726 the mobile device processor may determine whether a user input or other user actions indicate the notification was acknowledged. As an example, an answer indication received from a smart phone may indicate a notification for an incoming call was acknowledged. As another example, no user input being detected at a device within a set time period may indicate the notification was ignored. If the notification was acknowledge by the user through some form of user input (e.g., determination block 726="Yes"), in block 728 selected weighting values used in executing the algorithm to select the notification may be increased or otherwise adjusted to "learn" from the successful notification. As an example, each weighting value in a weighting value lookup table for the selected weighting values may be increase by a set value, such as 1. In this manner, the weighting values corresponding to acknowledged notifications may be increased and future selections of notifications may be modified to be more likely to be acknowledged by the user based on the user's actions. If the notification was ignored (e.g., determination block 726="No"), in block 730 the selected weighting values used in executing the algorithm to select the notification may be decreased or otherwise adjusted to "learn" from the unsuccessful notification. As an example, each weighting value in a weighting value lookup table for selected weighting values may be decreased by a set value, such as 1. In this manner, the weighting values corresponding to ignored notifications may be decreased and future selections of notifications may be modified to be less likely to be acknowledged by the used based on the user's actions.

Figure 8:
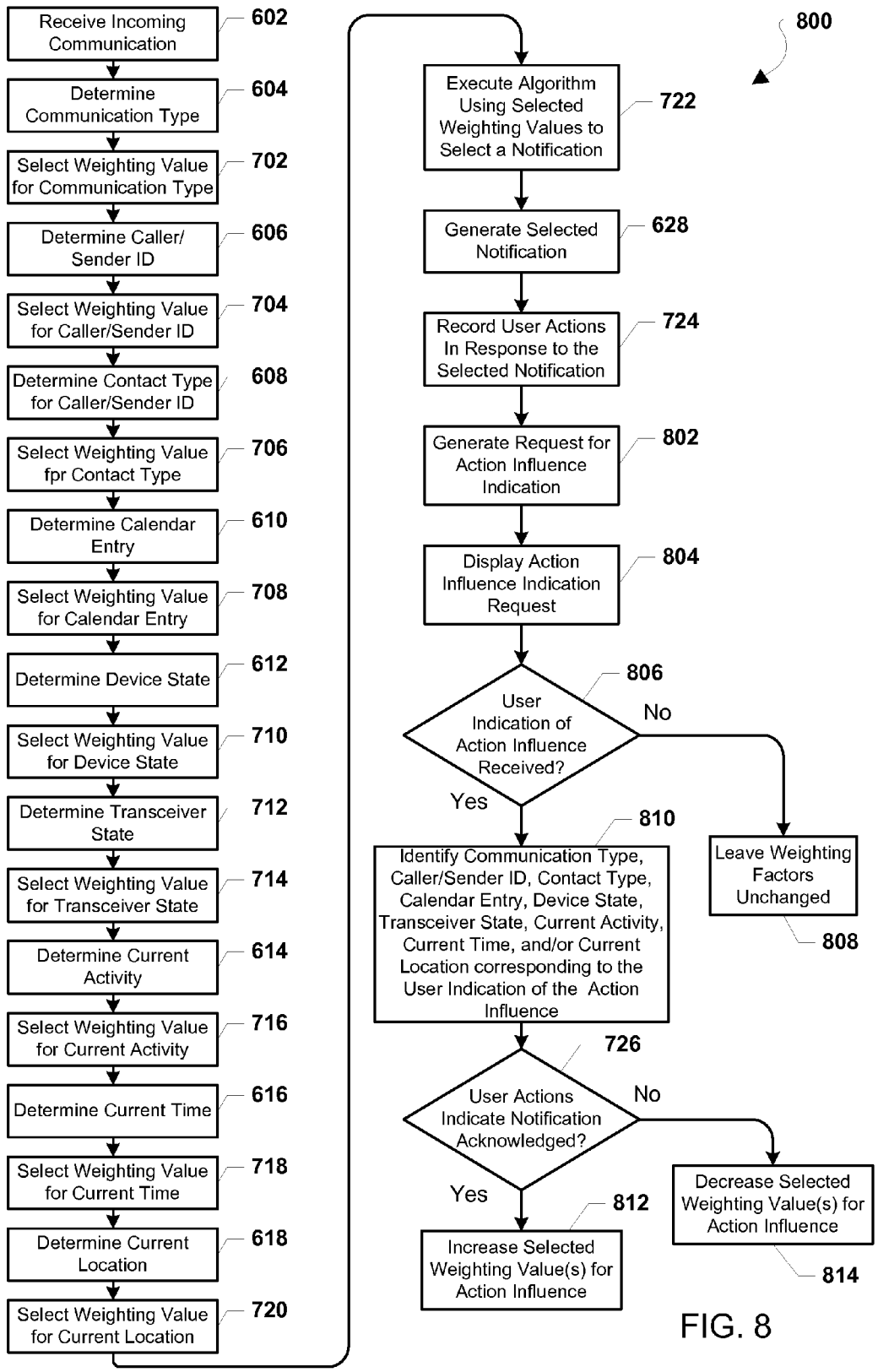
FIG. 8 is a process flow diagram illustrating another embodiment method for modifying assigned weighting values.

FIG. 8 illustrates an embodiment method 800 for executing an algorithm using assigned weighting values to select a notification and modifying assigned weighting values based on user actions. Method 800 is similar to method 700 described above with reference to FIG. 7, except that in method 800 only the weighting values that influenced the user's action may be modified rather than all weighting values used to select a notification. In an embodiment, the operations of method 800 may be performed by the processor of a mobile device, such as a smart phone or laptop computer, and/or of a personal hub. In blocks 602, 604, 702, 606, 704, 608, 706, 610, 708, 612, 710, 712, 714, 614, 716, 616, 718, 618, 720, 722, 628, and 724 the mobile device processor may perform operations of like numbered blocks of method 700 described above with reference to FIG. 7 to generate a selected notification and record user actions in response to the selected notification.

In block 802 the mobile device processor may generate a request for an action influence indication. In an embodiment, a request for an action influence indication may be a user interface element, such as a pop-up message, requesting the user identify one or more of the determined categories or sub-categories, such as communication type, caller/sender ID, contact type, calendar entry, device state, transceiver state, current activity, current time, and/or current location, as a factor which influenced the user's decision to acknowledge or ignore the generated notification. As an example, the request for an action influence indication may be a pop-up message including radio buttons corresponding to the determined categories or sub-categories. In block 804 the mobile device processer may display the action influence indication request, such as on a display of the mobile device. In determination block 806 the mobile device processor may determine whether a user indication of an action influence is received. As an example, the mobile device processor may determine whether a touch screen indication corresponding to a user selection of one or more of the determined categories or sub-categories presented in the action influence indication request was received. If no user indication is received (e.g., determination block 806="No"), in block 808 the mobile device processor may leave the weighting factors unchanged.

If a user indication of an action influence is received (e.g., determination block 806="Yes"), in block 810 the mobile device processor may identify the communication type, caller/sender ID, contact type, calendar entry, device state, transceiver state, current activity, current time, and/or current location corresponding to the user indication of the one or more action influences. As an example, the user may have selected a radio button associated with communication type as the action influence, and the mobile device processor may identify communication type as the action influence. As discussed above, in block 726 the mobile device processor may determine whether the user's actions indicate the notification was acknowledged.

If the notification was acknowledge (e.g., determination block 726="Yes"), in block 812 the selected weighting values for the identified one or more action influences may be increased. As an example, only those weighting values in a weighting value lookup table for the one or more action influences may be increase by a set value, such as 1. In this manner, the weighting values of specific categories and/or sub-categories corresponding to acknowledged notifications may be increased and future selections of notifications may be tailored to be more likely to be acknowledged by the user based on the user's actions. If the notification was ignored (e.g., determination block 726="No"), in block 814 the selected weighting values for the identified one or more action influences may be decreased. As an example, only those weighting values in a weighting value lookup table for the one or more action influences may be decreased by a set value, such as 1. In this manner, the weighting values of specific categories and/or sub-categories corresponding to ignored notifications may be decreased and future selections of notifications may be tailored to be more likely to be acknowledged by the user based on the user's actions.

Figure 9:
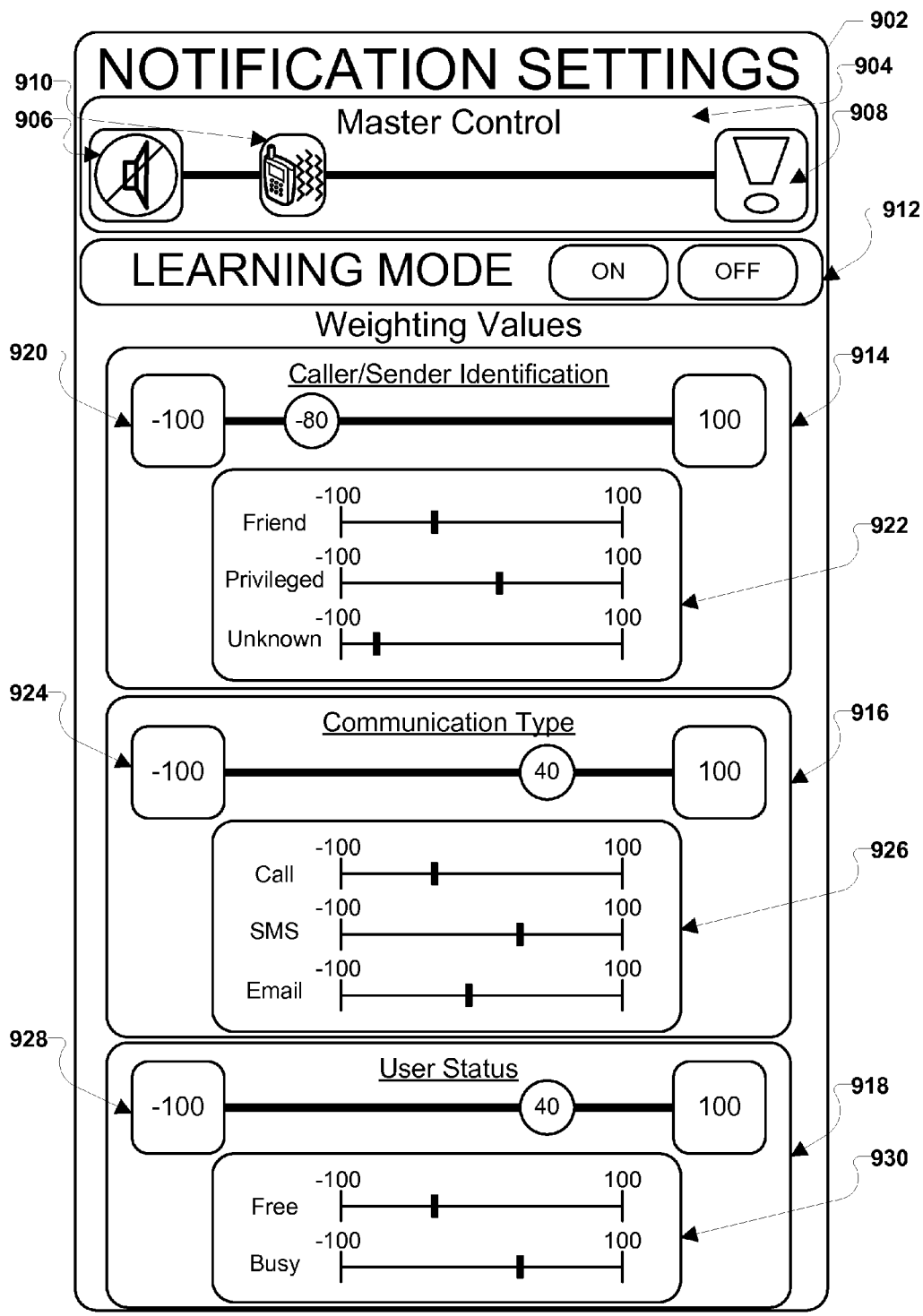
FIG. 9 is a component diagram of an example user interface for selecting weighting values.

FIG. 9 is a component diagram illustrating an example user interface 902 for selecting weighting values. The user interface 902 may include a master notification control user interface element 904 which may enable the user to select and modify all weighting values at the same time. The master notification control user interface element 904 may include a slide bar including an icon 906 for minimal notifications and an icon 908 for maximum notification 908. Additionally the icon 910 attributes, such as graphic and/or color, may change as the slider is adjusted between minimal notifications and maximum notifications. For example, at a more minimal notification setting the icon 910 may show that the mobile device may vibrate. In this manner, a user may be given a visual indication of the type of notification that the current selection may result in. The user interface 902 may include a learning mode selection bar 912. In an embodiment, a learning mode selection bar may enable a user to toggle machine learning for a notification controller module on or off. In this manner, when the notification controller module has learned to a point where further machine learning may disrupt the user's desired notification settings, machine learning may be disabled. The user interface 902 may also include weighting value control elements 914, 916, and 918. Weighting value control element 914 may correspond to caller/sender identification weighting values and may include a category slide bar 920 to enable all category weighting values for caller/sender identification to be adjusted together, and sub-category slide bars 922 to enable specific sub-categories of weighting values, such as "Friend", "Privileged", or "Unknown" to be adjusted. A weighting value control element 916 may correspond to communication type weighting values and may include a category slide bar 924 to enable all category weighting values for communication types to be adjusted together, and sub-category slide bars 926 to enable specific sub-categories of weighting values, such as "Call", "SMS", or "Email" to be adjusted. A weighting value control element 918 may correspond to user status weighting values and may include a category slide bar 928 to enable all category weighting values for user status to be adjusted together, and sub-category slide bars 930 to enable specific sub-categories of weighting values, such as "Free" or "Busy" to be adjusted. Using the various slide bars in the user interface 902 the various weighting values may be user-selectable and user-configurable. In an embodiment, the positions of the various slide bars in the user interface 902 may correspond to weighting values in a weighting value lookup table stored in a memory of a mobile device, and changes to the various slide bar positions in the user interface 902 may result in changes to the weighting values in the weighting value lookup table stored in memory.

Figure 10:
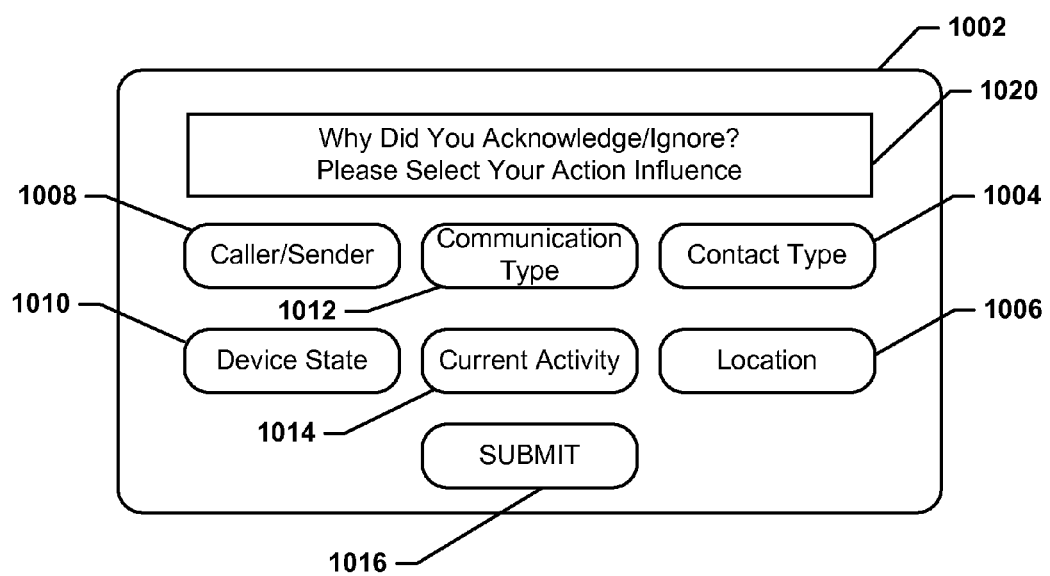
FIG. 10 is a component diagram of an example user interface for selecting an action influence.

FIG. 10 a component diagram illustrating an example user interface element 1002 for selecting an action influence. In an embodiment, the processor of a mobile device may generate and display an action influence indication request. The example user interface 1002 illustrates an example of an action influence indication request. In an embodiment, a user interface element 1002 may be a pop-up message displayed on a display of a mobile device. The user interface element 1002 may include a text element 1020 asking the user why he/she acknowledged or ignored the generated notification and directing the user to select the action influences corresponding to the user's reason for acknowledging or ignoring the generated notification. The user interface element 1002 may include various buttons 1004, 1006, 1008, 1010, 1012, 1014 corresponding to different categories and/or subcategories, such as "Caller/Sender", "Communication Type", "Contact Type", "Device State", "Current Activity", and "Location", which may be action influences for acknowledging or ignoring the generated notification. The user interface element 1002 may include a submit button 1016, which may enable the user's selection of one or more action influences— which the user selected using one of more of the buttons 1004, 1006, 1008, 1010, 1012, 1014—to be submitted to the mobile device processor. In this manner, the user may provide feedback to the mobile device processor enabling the mobile device processor to receive information about the specific reason notifications may have been acknowledged or ignored.

Figure 11:
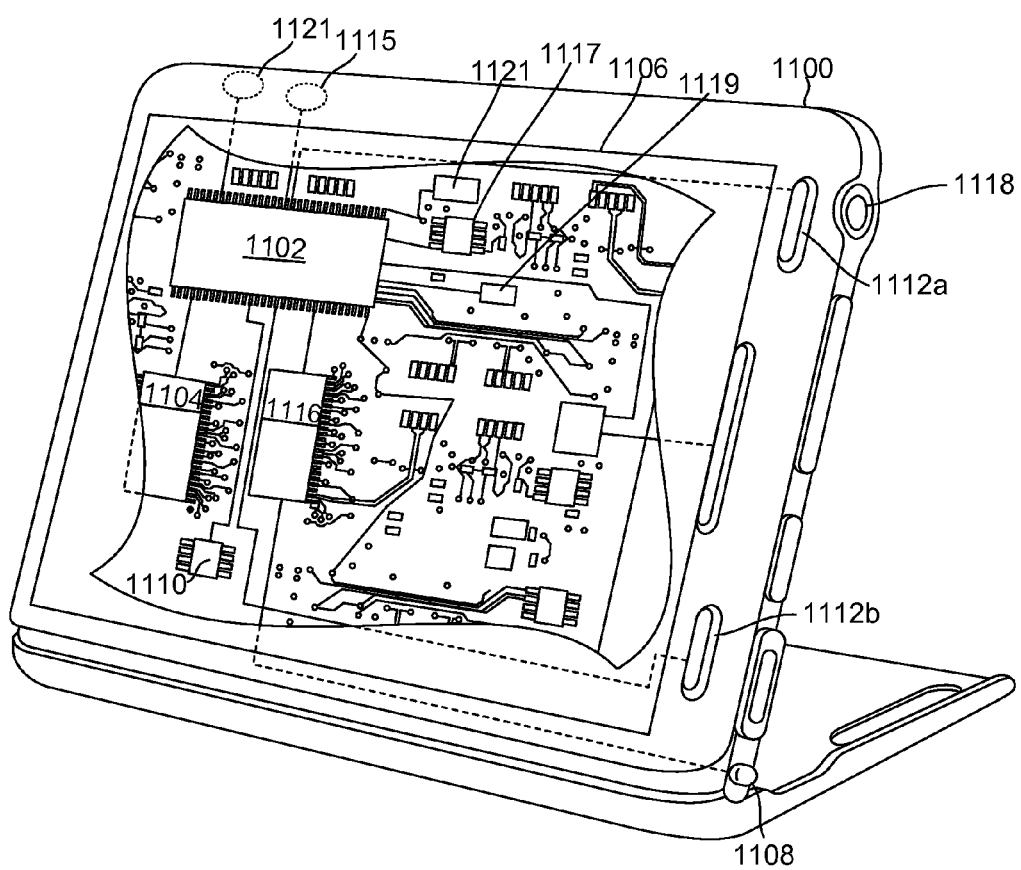
FIG. 11 is a component diagram of an example mobile device suitable for use with the various embodiments.

The various embodiments may be implemented in any of a variety of mobile devices, an example of which is illustrated in FIG. 11. For example, the mobile device 1100 may include a processor 1102 coupled to internal memories 1104 and 1110. Internal memories 1104 and 1110 may be volatile or non-volatile memories, and may also be secure and/or encrypted memories, or unsecure and/or unencrypted memories, or any combination thereof. The processor 1102 may also be coupled to a touch screen display 1106, such as a resistive-sensing touch screen, capacitive-sensing touch screen infrared sensing touch screen, or the like. Additionally, the display of the mobile device 1100 need not have touch screen capability. Additionally, the mobile device 1100 may have one or more antenna 1108 for sending and receiving electromagnetic radiation that may be connected to a wireless data link and/or cellular telephone transceiver 1116 coupled to the processor 1102. The mobile device 1100 may also include physical buttons 1112a and 1112b for receiving user inputs. The mobile device 1100 may also include a power button 1118 for turning the mobile device 1100 on and off. The mobile device 1100 may also include a vibratory motor 1121 coupled to the processor 1102 to enable the mobile device 1100 to vibrate so that a vibration notification can be generated on the mobile device 1100. Additionally, the mobile device 1100 may include a camera 1115 coupled to the processor 1102. The mobile device 1100 may include various sensors, such as a temperature sensor 1117, and one or more activity sensors 1119, such as accelerometers and/or gyroscopes, coupled to the processor 1102. Additionally, the mobile device 1100 may include a location sensor 1121, such as a GPS receiver, coupled to the processor 1102.

Figure 12:
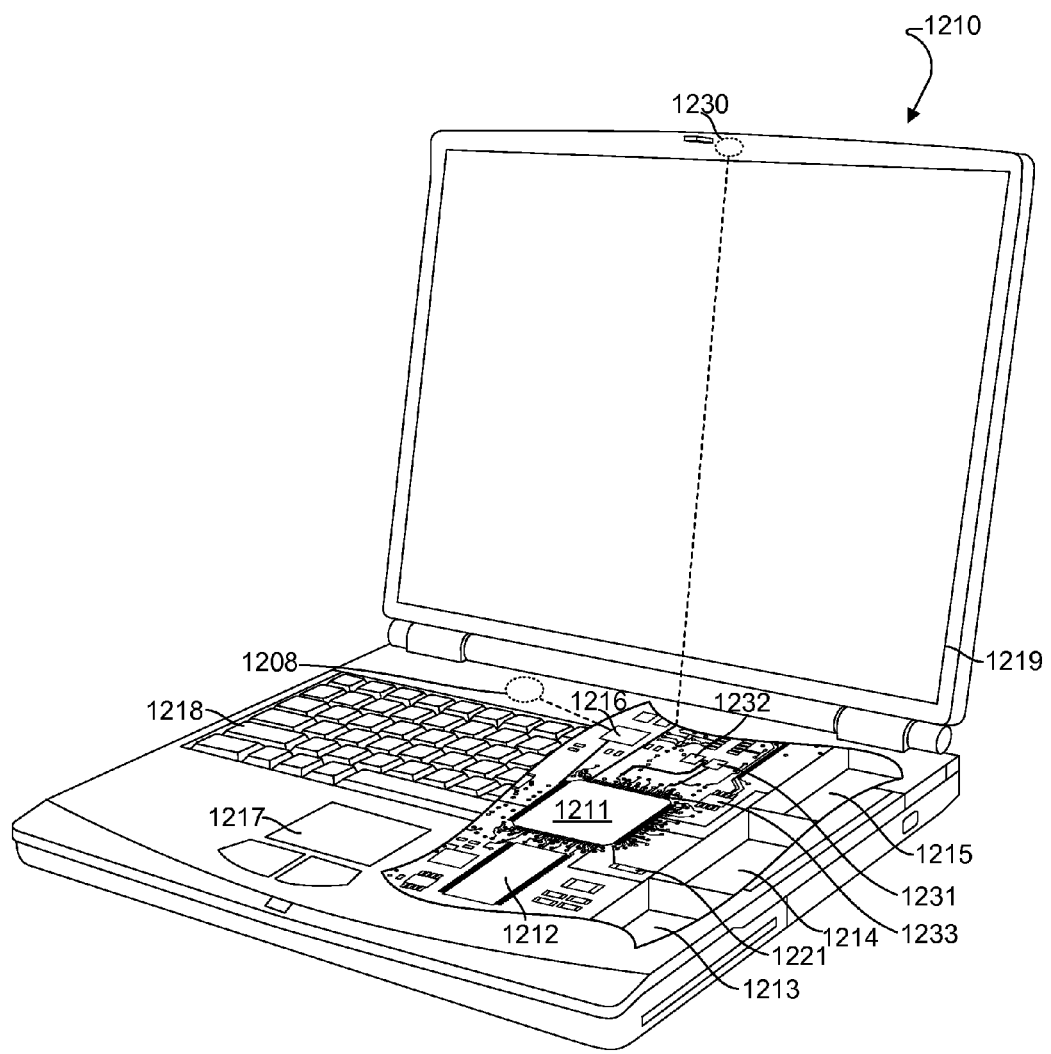
FIG. 12 is a component diagram of another example mobile device suitable for use with the various embodiments.

The various embodiments described above may also be implemented within a variety of mobile devices, such as a laptop computer 1210 illustrated in FIG. 12. Many laptop computers include a touch pad touch surface 1217 that serves as the computer's pointing device, and thus may receive drag, scroll, and flick gestures similar to those implemented on mobile computing devices equipped with a touch screen display and described above. A laptop computer 1210 will typically include a processor 1211 coupled to volatile memory 1212 and a large capacity nonvolatile memory, such as a disk drive 1213 of Flash memory. The computer 1210 may also include a floppy disc drive 1214 and a compact disc (CD) drive 1215 coupled to the processor 1211. The computer device 1210 may also include a number of connector ports coupled to the processor 1211 for establishing data connections or receiving external memory devices, such as a USB or FireWire® connector sockets, or other network connection circuits for coupling the processor 1211 to a network. In a notebook configuration, the computer housing includes the touchpad 1217, the keyboard 1218, and the display 1219 all coupled to the processor 1211. Other configurations of the computing device may include a computer mouse or trackball coupled to the processor (e.g., via a USB input) as are well known, which may also be use in conjunction with the various embodiments. Additionally, the laptop computer 1210 may have one or more antenna 1208 for sending and receiving electromagnetic radiation that may be connected to a wireless data link and/or cellular telephone transceiver 1216 coupled to the processor 1211. The laptop computer 1210 may also include a vibratory motor 1221 coupled to the processor 1211 to enable the laptop computer 1210 to vibrate so that a vibration notification can be generated on the laptop computer 1210. Additionally, the laptop computer 1210 may include a camera 1230 coupled to the processor 1211. The laptop computer 1210 may include various sensors, such as a temperature sensor 1231, and one or more activity sensors 1232, such as accelerometers and/or gyroscopes, coupled to the processor 1211. Additionally, the laptop computer 1210 may include a location sensor 1233, such as a GPS receiver, coupled to the processor 1211.

Figure 13:
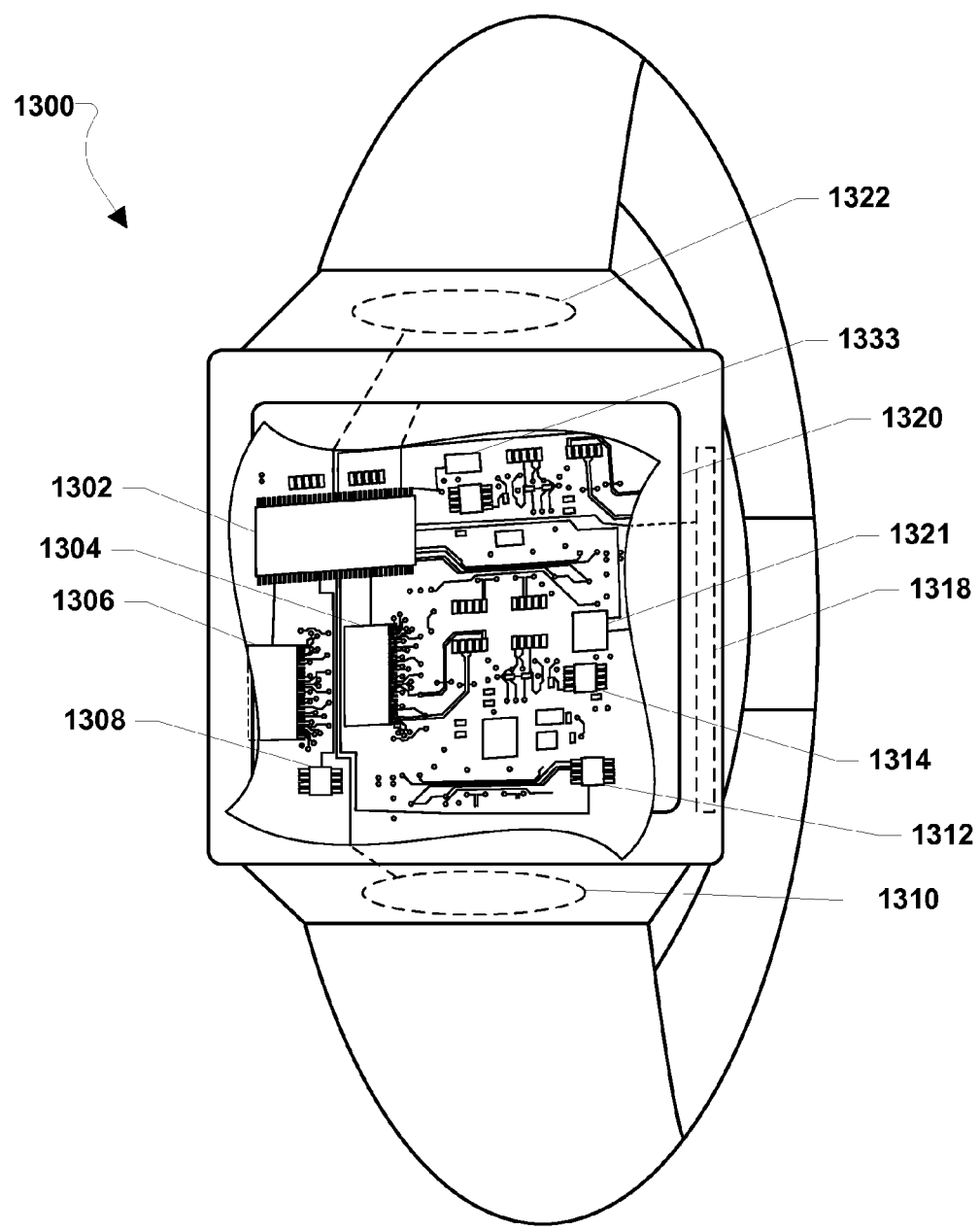
FIG. 13 is a component diagram of a personal hub suitable for use with the various embodiments.

The various embodiments described above may also be implemented within a variety of personal hubs, such as a wrist watch type personal hub 1300 illustrated in FIG. 13. A personal hub 1300 may include a processor 1302 coupled to internal memories 1304 and 1306. Internal memories 1304 and 1306 may be volatile or non-volatile memories, and may also be secure and/or encrypted memories, or unsecure and/or unencrypted memories, or any combination thereof. The processor 1302 may also be coupled to a touch screen display 1320, such as a resistive-sensing touch screen, capacitive-sensing touch screen infrared sensing touch screen, or the like. Additionally, the personal hub 1300 may have one or more antenna 1308 for sending and receiving electromagnetic radiation that may be connected to a wireless data link and coupled to the processor 1302. The personal hub 1300 may also include physical buttons 1322 and 1310 for receiving user inputs as well as a slide sensor 1318 for receiving user inputs. The personal hub 1300 may also include a vibratory motor 1321 coupled to the processor 1302 to enable the personal hub 1300 to vibrate so that a vibration notification can be generated on the user's wrist. The personal hub 1300 may also include various sensors, such as a temperature sensor 1314 and activity sensors 1312, such as accelerometers and/or gyroscopes, coupled to the processor 1302. Additionally, the personal hub 1300 may include a location sensor 1333, such as a GPS receiver, coupled to the processor 1302.

Figure 14A:
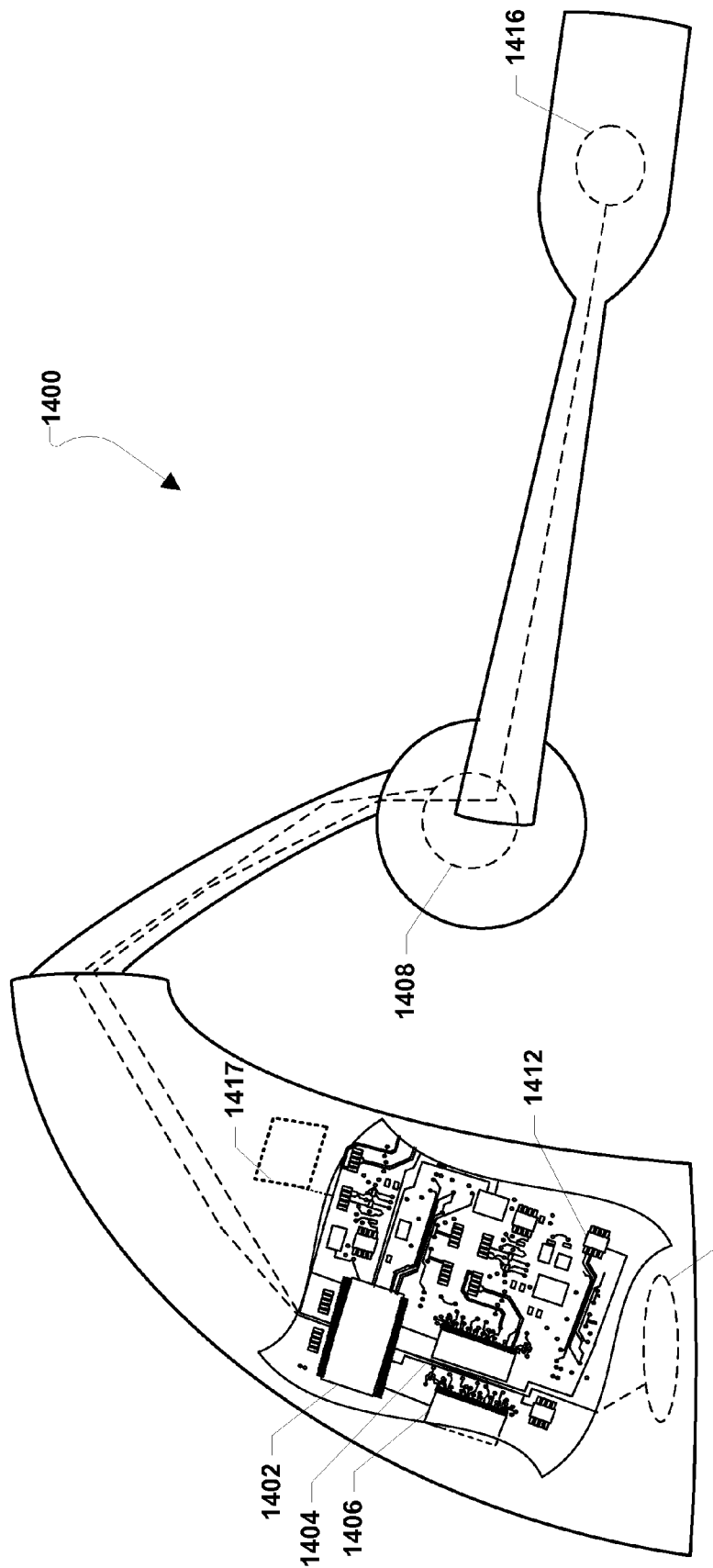
FIGS. 14A and 14B are component diagrams of a wireless earpiece suitable for use with the various embodiments.

The various embodiments described above may also be implemented within a variety of wireless earpieces, such as wireless earpiece 1400 illustrated in FIG. 14A. A wireless earpiece 1400 may include a processor 1402 coupled to internal memories 1404 and 1406. Internal memories 1404 and 1406 may be volatile or non-volatile memories, and may also be secure and/or encrypted memories, or unsecure and/or unencrypted memories, or any combination thereof. The wireless earpiece 1400 may include a physical button 1414 for receiving user inputs. Additionally, the wireless earpiece 1400 may have one or more antenna 1412 for sending and receiving electromagnetic radiation that may be connected to a wireless data link and coupled to the processor 1402. The wireless earpiece 1400 may include a speaker 1408 coupled to the processor 1402 and configured to generate an audio output. The wireless earpiece 1400 may also include a microphone 1416 coupled to the processor 1402 to receive an audio input. The wireless earpiece 1400 may also include a vibratory motor 1417 coupled to the processor 1402 configured to vibrate the wireless earpiece 1400 to generate a user-perceptible notification.

Figure 14B:
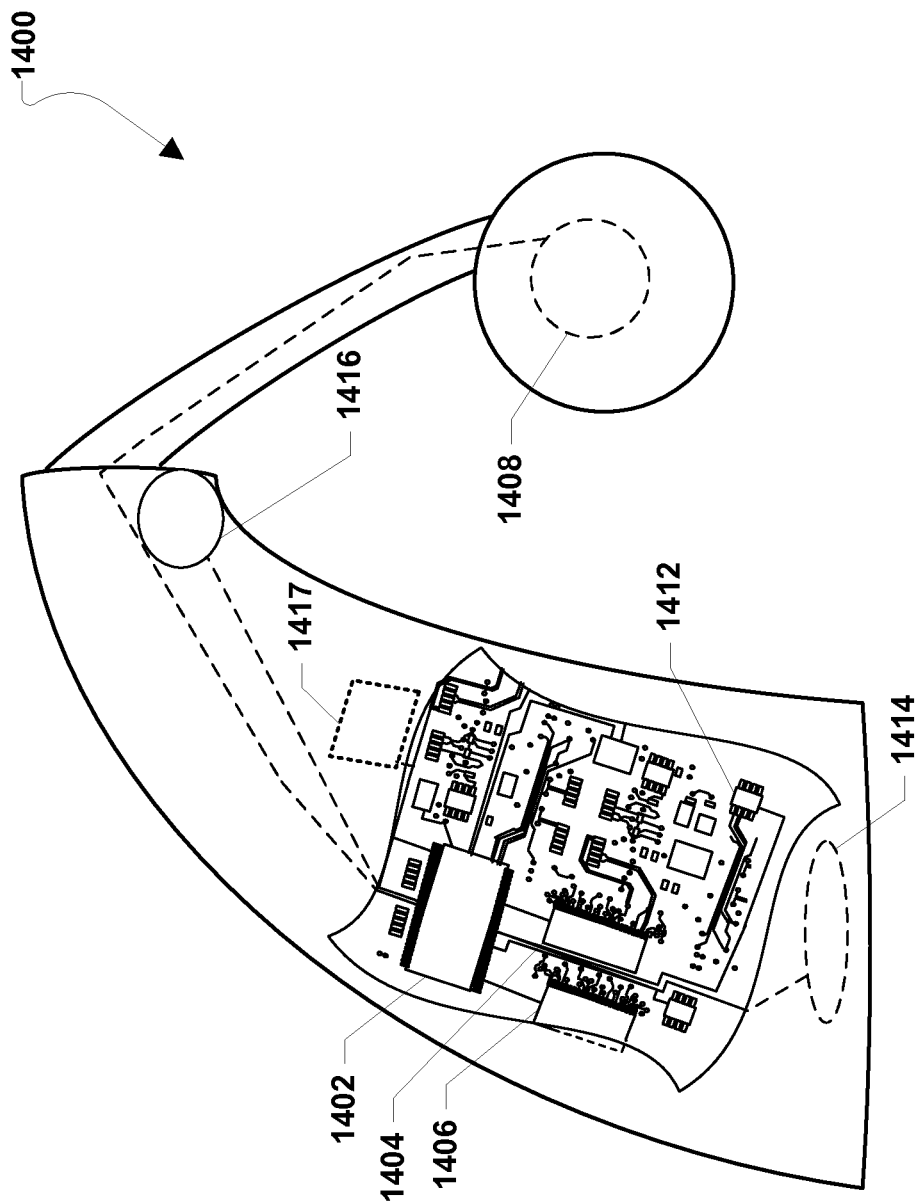

FIG. 14B illustrates an alternative embodiment of the wireless earpiece 1400 in which the microphone 1416 may be positioned within a main housing of the wireless earpiece 1400 rather than on a microphone boom extending toward the user's mouth when the wireless earpiece is worn. In an embodiment, the microphone 1416 may be a directional microphone, and the earpiece housing may be configured such that the microphone 1416 is pointed toward the mouth of the user when the user is wearing the earpiece 1416. Audio processing of microphone data may be used to further direct the microphone sensitivity in order to capture audio data from the user's mouth. In this manner, the microphone 1416 may receive audio input from the user of the wireless earpiece 1416.

The processors 1102, 1211, 1302, and 1402 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1104, 1110, 1212, 1213, 1304, 1306, 1404, and 1406 before they are accessed and loaded into the processors 1102, 1211, 1302, and 1402. The processors 1102, 1211, 1302, and 1402 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1102, 1211, 1302, and 1402 including internal memory or removable memory plugged into the device and memory within the processor 1102, 1211, 1302, and 1402 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of notifying a user of a mobile device of incoming communications, the method comprising:
   receiving an incoming communication on the mobile device;
   determining a caller/sender identification for the incoming communication;
   determining a communication type for the incoming communication;
   determining a user status;
   selecting weighting values for the caller/sender identification, the communication type, and the user status;
   executing an algorithm using the selected weighting values to select a notification for the incoming communication, wherein the executed algorithm adds to, subtracts from, multiplies, or divides at least one of the selected weighting values to select the notification for the incoming communication; and
   generating the selected notification on the mobile device.

2. The method of claim 1, further comprising:
   recording user actions in response to the generated selected notification; and
   modifying future selections of notifications based at least in part of the recorded user actions.

3. The method of claim 2, wherein modifying future selections of notifications based at least in part on the recorded user actions comprises:
   increasing selected weighting values when the recorded user actions indicate the user acknowledged the generated selected notification; and
   decreasing selected weighting values when the recorded user actions indicate the user ignored the generated selected notification.

4. The method of claim 2, wherein modifying future selections of notifications based at least in part on the recorded user actions comprises:
   identifying one of the caller/sender identification, the communication type, and the user status as an action influence;
   increasing the selected weighting value for the action influence when the recorded user actions indicate the user acknowledged the generated selected notification; and
   decreasing the selected weighting value for the action influence when the recorded user actions indicate the user ignored the generated selected notification.

5. The method of claim 4, wherein identifying one of the caller/sender identification, the communication type, and the user status as an action influence comprises receiving a user indication of one of the caller/sender identification, the communication type, and the user status as an action influence.

6. The method of claim 1, wherein the selected weighting values are user selectable or configurable.

7. The method of claim 1, wherein the incoming communication is one of a phone call, email, tweet, facebook update, text message, and application message.

8. The method of claim 1, wherein the user status is one or more of activity sensor data, device state data, transceiver data, calendar entries, time information, and location information.

9. The method of claim 1, wherein the caller/sender identification includes an indication regarding whether the caller/sender is a privileged contact.

10. A mobile device comprising: means for receiving an incoming communication; means for determining a caller/sender identification for the incoming communication; means for determining a communication type for the incoming communication; means for determining a user status; means for selecting weighting values for the caller/sender identification, the communication type, and the user status; means for executing an algorithm using the selected weighting values to select a notification for the incoming communication, wherein the executed algorithm adds to, subtracts from, multiplies, or divides at least one of the selected weighting values to select the notification for the incoming communication; and means for generating the selected notification.

11. The mobile device of claim 10, further comprising:
    means for recording user actions in response to the generated selected notification; and
    means for modifying future selections of notifications based at least in part of the recorded user actions.

12. The mobile device of claim 11, wherein means for modifying future selections of notifications based at least in part on the recorded user actions comprises:
    means for increasing selected weighting values when the recorded user actions indicate the user acknowledged the generated selected notification; and
    means for decreasing selected weighting values when the recorded user actions indicate the user ignored the generated selected notification.

13. The mobile device of claim 11, wherein means for modifying future selections of notifications based at least in part on the recorded user actions comprises:
 means for identifying one of the caller/sender identification, the communication type, and the user status as an action influence;
 means for increasing the selected weighting value for the action influence when the recorded user actions indicate the user acknowledged the generated selected notification; and
 means for decreasing the selected weighting value for the action influence when the recorded user actions indicate the user ignored the generated selected notification.

14. The mobile device of claim 13, wherein means for identifying one of the caller/sender identification, the communication type, and the user status as an action influence comprises means for receiving a user indication of one of the caller/sender identification, the communication type, and the user status as an action influence.

15. The mobile device of claim 10, wherein the selected weighting values are user selectable or configurable.

16. The mobile device of claim 10, wherein the incoming communication is one of a phone call, email, tweet, Facebook update, text message, and application message.

17. The mobile device of claim 10, wherein the user status is one or more of activity sensor data, device state data, transceiver data, calendar entries, time information, and location information.

18. The mobile device of claim 10, wherein the caller/sender identification includes an indication regarding whether the caller/sender is a privileged contact.

19. A mobile device comprising: a memory; and a processor connected to the memory, wherein the processor is configured with processor-executable instructions to perform operations comprising: receiving an incoming communication; determining a caller/sender identification for the incoming communication; determining a communication type for the incoming communication; determining a user status; selecting weighting values for the caller/sender identification, the communication type, and the user status; executing an algorithm using the selected weighting values to select a notification for the incoming communication, wherein the processor is configured with processor-executable instructions to perform operations such that the executed algorithm adds to, subtracts from, multiplies, or divides at least one of the selected weighting values to select the notification for the incoming communication; and generating the selected notification on the mobile device.

20. The mobile device of claim 19, wherein the processor is configured with processor-executable instructions to perform operations further comprising:
 recording user actions in response to the generated selected notification; and
 modifying future selections of notifications based at least in part of the recorded user actions.

21. The mobile device of claim 20, wherein the processor is configured with processor-executable instructions to perform operations such that modifying future selections of notifications based at least in part on the recorded user actions comprises:
 increasing selected weighting values when the recorded user actions indicate the user acknowledged the generated selected notification; and
 decreasing selected weighting values when the recorded user actions indicate the user ignored the generated selected notification.

22. The mobile device of claim 20, wherein the processor is configured with processor-executable instructions to perform operations such that modifying future selections of notifications based at least in part on the recorded user actions comprises:
 identifying one of the caller/sender identification, the communication type, and the user status as an action influence;
 increasing the selected weighting value for the action influence when the recorded user actions indicate the user acknowledged the generated selected notification; and
 decreasing the selected weighting value for the action influence when the recorded user actions indicate the user ignored the generated selected notification.

23. The mobile device of claim 22, wherein the processor is configured with processor-executable instructions to perform operations such that identifying one of the caller/sender identification, the communication type, and the user status as an action influence comprises receiving a user indication of one of the caller/sender identification, the communication type, and the user status as an action influence.

24. The mobile device of claim 19, wherein the processor is configured with processor-executable instructions to perform operations such that the selected weighting values are user selectable or configurable.

25. The mobile device of claim 19, wherein the incoming communication is one of a phone call, email, tweet, facebook update, text message, and application message.

26. The mobile device of claim 19, wherein the user status is one or more of activity sensor data, device state data, transceiver data, calendar entries, time information, and location information.

27. The mobile device of claim 19, wherein the caller/sender identification includes an indication regarding whether the caller/sender is a privileged contact.

28. A non-transitory processor-readable medium having stored thereon processor-executable instructions configured to cause a processor of a mobile device to perform operations comprising: receiving an incoming communication; determining a caller/sender identification for the incoming communication; determining a communication type for the incoming communication; determining a user status; selecting weighting values for the caller/sender identification, the communication type, and the user status; executing an algorithm using the selected weighting values to select a notification for the incoming communication, wherein the stored processor-executable instructions are configured to cause a processor of a mobile device to perform operations such that the executed algorithm adds to, subtracts from, multiplies, or divides at least one of the selected weighting values to select the notification for the incoming communication; and generating the selected notification on the mobile device.

29. The non-transitory processor-readable medium of claim 28, wherein the stored processor-executable instructions are configured to cause a processor of a mobile device to perform operations further comprising:
 recording user actions in response to the generated selected notification; and
 modifying future selections of notifications based at least in part of the recorded user actions.

30. The non-transitory processor-readable medium of claim 29, wherein the stored processor-executable instructions are configured to cause a processor of a mobile device to perform operations such that modifying future selections of notifications based at least in part on the recorded user actions comprises:

increasing selected weighting values when the recorded user actions indicate the user acknowledged the generated selected notification; and decreasing selected weighting values when the recorded user actions indicate the user ignored the generated selected notification.

31. The non-transitory processor-readable medium of claim 29, wherein the stored processor-executable instructions are configured to cause a processor of a mobile device to perform operations such that modifying future selections of notifications based at least in part on the recorded user actions comprises:

identifying one of the caller/sender identification, the communication type, and the user status as an action influence;

increasing the selected weighting value for the action influence when the recorded user actions indicate the user acknowledged the generated selected notification; and decreasing the selected weighting value for the action influence when the recorded user actions indicate the user ignored the generated selected notification.

32. The non-transitory processor-readable medium of claim 31, wherein the stored processor-executable instructions are configured to cause a processor of a mobile device to perform operations such that identifying one of the caller/sender identification, the communication type, and the user status as an action influence comprises receiving a user indication of one of the caller/sender identification, the communication type, and the user status as an action influence.

33. The non-transitory processor-readable medium of claim 28, wherein the stored processor-executable instructions are configured to cause a processor of a mobile device to perform operations such that the selected weighting values are user selectable or configurable.

34. The non-transitory processor-readable medium of claim 28, wherein the incoming communication is one of a phone call, email, tweet, facebook update, text message, and application message.

35. The non-transitory processor-readable medium of claim 28, wherein the user status is one or more of activity sensor data, device state data, transceiver data, calendar entries, time information, and location information.

36. The non-transitory processor-readable medium of claim 28, wherein the caller/sender identification includes an indication regarding whether the caller/sender is a privileged contact.

37. A method of notifying a user of a mobile device of incoming communications, the method performed by an electronic device, the method comprising: executing an algorithm using weighting values to select a notification for an incoming communication received on a mobile device, the weighting values including weighting values for a caller/sender identification for the incoming communication received on the mobile device, a communication type for the incoming communication received on the mobile device, and a user status, wherein the executed algorithm adds to, subtracts from, multiplies, or divides at least one of the weighting valued to select the notification for the incoming communication; and triggering a generation of the selected notification.

38. The method of claim 37, wherein the electronic device is the mobile device; and wherein triggering a generation of the selected notification comprises generating the selected notification on the mobile device.

39. The method of claim 37, wherein the electronic device is the mobile device; and wherein triggering a generation of the selected notification comprises wirelessly triggering a generation of the selected notification on a wrist-worn electronic device that is distinct from the mobile device.

40. The method of claim 37, wherein the electronic device is the mobile device; and wherein triggering a generation of the selected notification comprises wirelessly triggering a generation of the selected notification on an earpiece that is distinct from the mobile device.

41. The method of claim 37, wherein the electronic device is a wrist-worn electronic device that is distinct from the mobile device; and wherein triggering a generation of the selected notification comprises generating the selected notification on the wrist-worn electronic device.

42. The method of claim 37, wherein the electronic device is a wrist-worn electronic device that is distinct from the mobile device; and wherein triggering a generation of the selected notification comprises wirelessly triggering a generation of the selected notification on an earpiece that is distinct from the mobile device.

43. The method of claim 37, wherein the electronic device is a wrist-worn electronic device that is distinct from the mobile device; and wherein triggering a generation of the selected notification comprises wirelessly triggering a generation of the selected notification on the mobile device.

* * * * *